US008237963B2

(12) United States Patent
Urakawa

(10) Patent No.: US 8,237,963 B2
(45) Date of Patent: Aug. 7, 2012

(54) COMMUNICATION APPARATUS

(75) Inventor: Yutaka Urakawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 477 days.

(21) Appl. No.: 12/363,672

(22) Filed: Jan. 30, 2009

(65) Prior Publication Data

US 2009/0195826 A1  Aug. 6, 2009

(30) Foreign Application Priority Data

Jan. 31, 2008 (JP) ................................ 2008-020409

(51) Int. Cl.
G06F 3/12 (2006.01)
(52) U.S. Cl. ...................................... 358/1.15; 358/402
(58) Field of Classification Search .................. None
See application file for complete search history.

(56) References Cited

U.S. PATENT DOCUMENTS

| 2004/0141200 | A1 | 7/2004 | Minami et al. | |
|---|---|---|---|---|
| 2005/0088302 | A1 | 4/2005 | Pucci et al. | |
| 2005/0141003 | A1 | 6/2005 | Yamamoto et al. | |
| 2006/0176510 | A1* | 8/2006 | Nishizawa | 358/1.15 |
| 2006/0215228 | A1* | 9/2006 | Inaba | 358/3.28 |
| 2007/0058994 | A1 | 3/2007 | Yaguchi | |
| 2007/0253419 | A1* | 11/2007 | Oshima | 370/392 |
| 2008/0008318 | A1* | 1/2008 | Kinoshita | 380/217 |
| 2009/0309731 | A1 | 12/2009 | Chan | |
| 2010/0174974 | A1 | 7/2010 | Brisebois et al. | |
| 2010/0274859 | A1 | 10/2010 | Bucuk | |

FOREIGN PATENT DOCUMENTS

| JP | H05-191544 A | 7/1993 |
|---|---|---|
| JP | H06-350766 A | 12/1994 |
| JP | 2004-222085 A | 8/2004 |
| JP | 2005-012701 A | 1/2005 |
| JP | 2005-197835 A | 7/2005 |
| JP | 2005-204177 A | 7/2005 |
| JP | 2005-295454 A | 10/2005 |
| JP | 2005-319672 A | 11/2005 |

(Continued)

OTHER PUBLICATIONS

Japan Patent Office; Notification of Reasons for Refusal in Japanese Patent Application No. 2008-020409 mailed Apr. 13, 2010.

(Continued)

Primary Examiner — Twyler Haskins
Assistant Examiner — Helen Q Zong
(74) Attorney, Agent, or Firm — Baker Botts L.L.P.

(57) ABSTRACT

A communication apparatus includes: a reading unit which reads original document data from a read target original document having plural pages, on a page-by-page basis; a transmission unit which transmits original document data read by the reading unit; an acquisition unit which wirelessly acquires identification information capable of identifying a set of pages to be transmitted by the transmission unit in one communication, from a wireless tag attached to each page of the read target original document; an identification unit which identifies whether a combination of pages of the read target original document corresponds to a combination of pages of a specific set original document based on the identification information; and a transmission controller which controls the transmission unit to transmit the original document data from the read target original document based on a result of the identification unit.

15 Claims, 14 Drawing Sheets

FOREIGN PATENT DOCUMENTS

| | | |
|---|---|---|
| JP | 2005-348027 A | 12/2005 |
| JP | 2006-108854 A | 4/2006 |
| JP | 2006-109365 A | 4/2006 |
| JP | 2006-157439 A | 6/2006 |
| JP | 2006-254058 A | 9/2006 |
| JP | 2007-067661 A | 3/2007 |
| JP | 2007-150573 A | 6/2007 |
| JP | 2007-235315 A | 9/2007 |

OTHER PUBLICATIONS

Japan Patent Office, Notification of Reasons for Refusal for Japanese Patent Application No. 2008-020410 (counterpart to above-captioned patent application), dispatched Apr. 13, 2010.

* cited by examiner

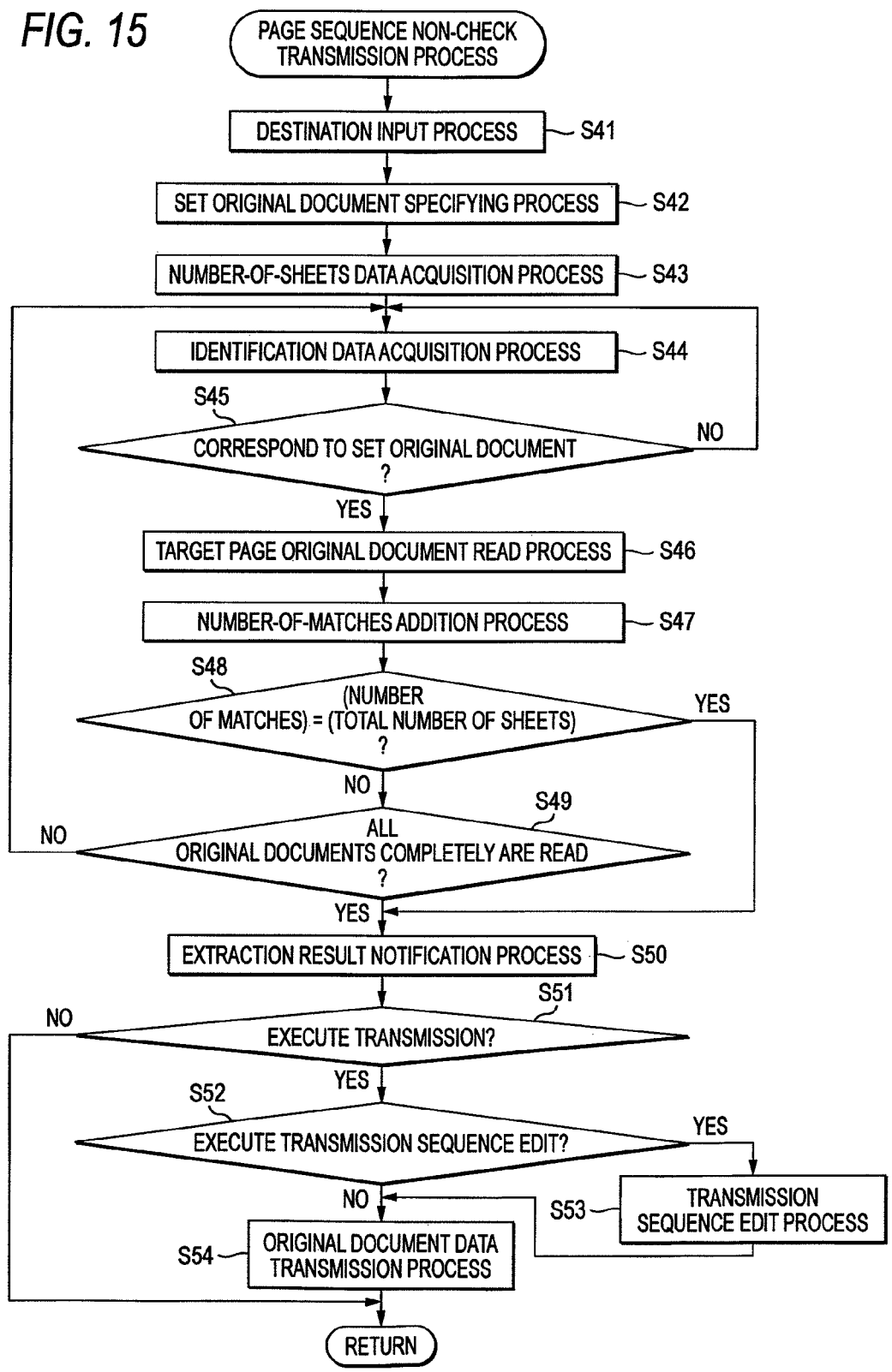

FIG. 16

EXTRACTION RESULT NOTIFICATION

| Total Number of Sheets | 5 pages |
| Number of Extracted Sheets | 4 pages |
| Extraction Page Sequence | 3 1 4 5 |
| Missing Page | 2 |

[Page Sequence Edit Transmission] [Transmission Continue] [Cancel]

FIG. 17

EXTRACTION RESULT NOTIFICATION

| Total Number of Sheets | 5 pages |
| Number of Extracted Sheets | 5 pages |
| Extraction Page Sequence | 3 1 4 5 2 |
| Missing Page | |

[Page Sequence Edit Transmission] [Transmission Continue] [Cancel]

COMMUNICATION APPARATUS

CROSS-REFERENCE TO RELATED APPLICATION

This application claims priority from Japanese Patent Application No. 2008-020409, filed on Jan. 31, 2008, the entire subject matter of which is incorporated herein by reference.

TECHNICAL FIELD

Aspects of the present invention relate to a communication apparatus having a reading unit which reads original document data from an original document and a transmission unit which transmits the original document data to a desired destination, and more particularly, to a communication apparatus having acquisition unit which acquires data from a wireless tag attached to the original document.

BACKGROUND

A communication apparatus is configured to read original document data (that is, image data) from an original document and transmit the original document data to a user-desired destination. Recently, communication apparatuses utilizing a wireless tag have been considered to improve convenience in transmitting original document data.

Japanese Patent Application Publication No. 2005-348027 describes such a communication apparatus. The communication apparatus described in the publication utilizes a wireless tag attached to a business card or the like and improves convenience in facsimile transmission. Specifically, the communication apparatus acquires destination information (for example, information indicating a facsimile number) written in the wireless tag from the wireless tag attached to the business card or the like. The communication apparatus specifies a destination of facsimile transmission based on the acquired destination information and facsimiles original document data. That is, the communication apparatus simplifies user operation related to the destination of the facsimile transmission and improves convenience in the facsimile transmission.

As described above, the communication apparatus described in JP-A-2005-348027 utilizes a wireless tag to "simplify a designation operation of a destination of facsimile transmission". However, in order to improve convenience related to facsimile transmission, a method for effectively utilizing a wireless tag, that is, information written to the wireless tag, is not limited to a manner as described in JP-A-2005-348027. That is, in a communication apparatus field, a method for effectively utilizing a wireless tag to improve convenience in facsimile transmission has not been sufficiently studied.

Here, when facsimile transmission is performed, an original document to be transmitted by a user can be mixed with other original documents. In this case, the user has to search for an original document to be transmitted from large amount of original document in which the original document to be transmitted is mixed with other original document in order to perform desired facsimile transmission. To search for the original document to be transmitted, the user has to scan content of each page of the large amount of original document. That is, in this case, in a related-art communication apparatus such as the communication apparatus described in JP-A-2005-348027, very complex work and burden are forced to the user and convenience is not sufficient.

Specifically, when an original document, which is facsimiled once, needs to be retransmitted by a facsimile, the above-described problem is apt to occur. In general, since once an original document is facsimiled, it is considered to be less essential and the user is apt to neglect the management of the original document. Then, the original document, which is required after facsimile transmission, is apt to be mixed with other documents (including other original documents) around the original document. Accordingly, in this case, the above-described problem is further remarkable.

Additionally, the following case is conceivable. When only a document required for facsimile transmission is selected from among documents separately managed in a file, and the like and transmitted as a set original document, the user returns the set original document to the original file after transmission. When the same set original document needs to be re-transmitted or copied, the user searches for the original document by remembering the previously selected document. In this case, the work to check whether the found original document has been actually facsimiled previously may become very troublesome.

In this regard, when the necessity of facsimile retransmission of an original document, which is once facsimiled, occurs, one solution method does exist. That is, when a previous facsimile transmission is performed, a communication apparatus stores original document data acquired at that time in a memory. When facsimile retransmission is required, the previously acquired original document data stored in the memory is transmitted. If this method is adopted, the above-described problem may be solved when the necessity of facsimile retransmission of an original document, which is once facsimiled, occurs. However, since a memory capacity of storing original document data is limited in this solution method, the above-described problem can not be solved.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a communication apparatus which can transmit original document data read by a reading unit and which includes an acquisition unit to acquire data from a wireless tag attached to the original document, more particularly, to provide a communication apparatus which utilizes data acquired from a wireless tag to improve convenience in transmitting original document data of original document to be handled as a set.

According to an exemplary embodiment of the present invention, there is provided a communication apparatus including: a reading unit which reads original document data from a read target original document comprising a plurality of pages, on a page-by-page basis; a transmission unit which transmits original document data read by the reading unit to a designated destination; an acquisition unit which wirelessly acquires identification information capable of identifying a set of pages to be transmitted by the transmission unit in one communication, from a wireless tag attached to each page of the read target original document; an identification unit which identifies whether a combination of pages of the read target original document corresponds to a combination of pages of a specific set original document based on the identification information acquired by the acquisition unit; and a transmission controller which controls the transmission unit to transmit the original document data from the read target original document to a destination if the identification unit identifies that the combination of pages of the read target original document corresponds to that of the specific set original document.

According to another exemplary embodiment of the present invention, there is provided a method for transmitting original document data, the method comprising: reading first original document data from a first original document comprising a plurality of pages; transmitting the first original document data to a designated destination in one communication; wirelessly writing identification information to a wireless tag attached to each page of the first original document, the identification information comprising date-time information indicating a date and time related to a transmission of the first original document data; storing the date-time information in a history storage unit; reading second original document data from a second original document comprising a plurality of pages; wirelessly acquiring identification information comprising date-time information from a wireless tag attached to each page of the second original document; determining whether the second original document is same as the first original document by comparing the date-time information in the history storage unit and the data-time information acquired from the second original document; and transmitting the second original document data to a designated destination if it is determined that the second original document is same as the first original document.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 15 is a flowchart of a page sequence non-check transmission program;

FIG. 16 is an illustrative view showing a display example of an extraction result notification screen (entire page extraction screen); and FIG. 17 is an illustrative view showing a display example of an extraction result notification screen (page missing error notification screen).

DETAILED DESCRIPTION

Hereinafter, a communication apparatus according to an exemplary embodiment of the present invention will be described in detail with reference to the drawings. In the exemplary embodiment, the inventive concept of the present invention is applied to a facsimile apparatus.

Figure 1:
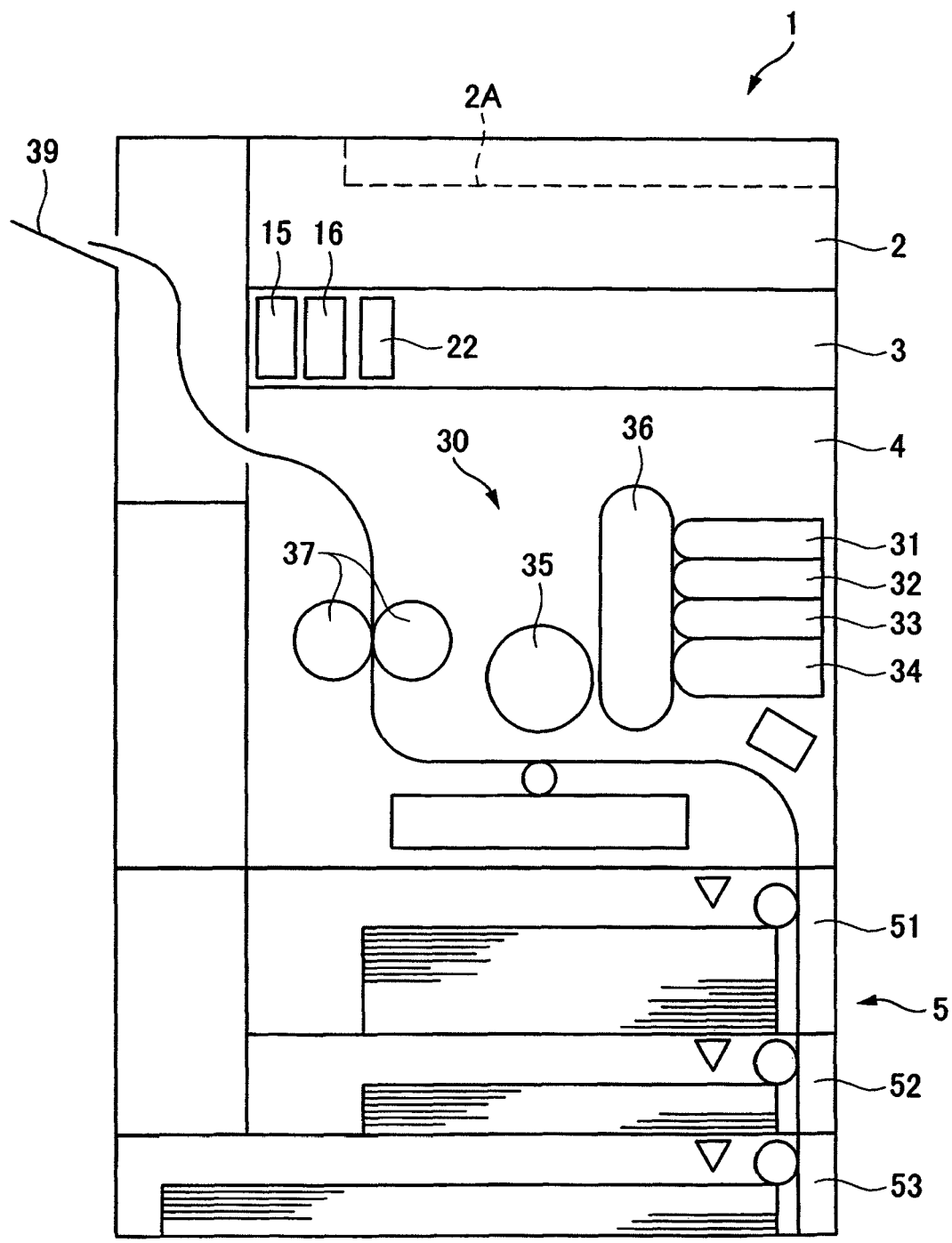
FIG. 1 is a schematic cross-sectional view of a facsimile apparatus according to an exemplary embodiment.

As shown in FIG. 1, a facsimile apparatus 1 includes an automatic original document feeder 2, a scanner unit 3, a printer unit 4, and a sheet-feeding tray unit 5.

The scanner unit 3 includes a wireless tag reader 15, a wireless tag writer 16, and a scanner 22. When a wireless tag 62 is attached to an original document fed by the automatic original document feeder 2 (for example, a transmission original document 61 (see FIG. 3), and the like), the wireless tag reader 15 wirelessly reads data (identification data to be described later, and the like) from the wireless tag 62. The wireless tag writer 16 wirelessly writes data (identification data to be described later, and the like) to the wireless tag 62 attached to the original document. The scanner 22 reads image data as original document data of an original document fed by the automatic original document feeder 2 regardless of the presence or absence of the wireless tag 62. Herein, the wireless tag refers to a recording medium, to which data is wirelessly writable, and from which data is wirelessly readable. Additionally, the wireless tag is also referred to as an IC tag or a radio frequency identification tag (RFID tag).

The printer unit 4 includes a laser printer 30. The laser printer 30 includes a Y station 31, an M station 32, a C station 33, and a K station 34. The Y station 31 contains yellow toner, the M station 32 contains magenta toner, the C station 33 contains cyan toner, and the K station 34 contains black toner. The laser printer 30 further includes fixing rollers 37 or an intermediate-transfer belt 36 for transferring toner of each station to a transfer drum 35. Any recording sheet to which the image is formed by the laser printer 30 is discharged to a sheet discharge stacker 39.

The sheet-feeding tray unit 5 includes a first sheet-feeding tray 51, a second sheet-feeding tray 52, and a third sheet-feeding tray 53. Each of the first to third sheet-feeding trays 51 to 53 includes a detection sensor 54. The detection sensor 54 detects whether the wireless tag is attached to the recording sheet accommodated in each of the first to third sheet-feeding trays 51 to 53.

Figure 2:
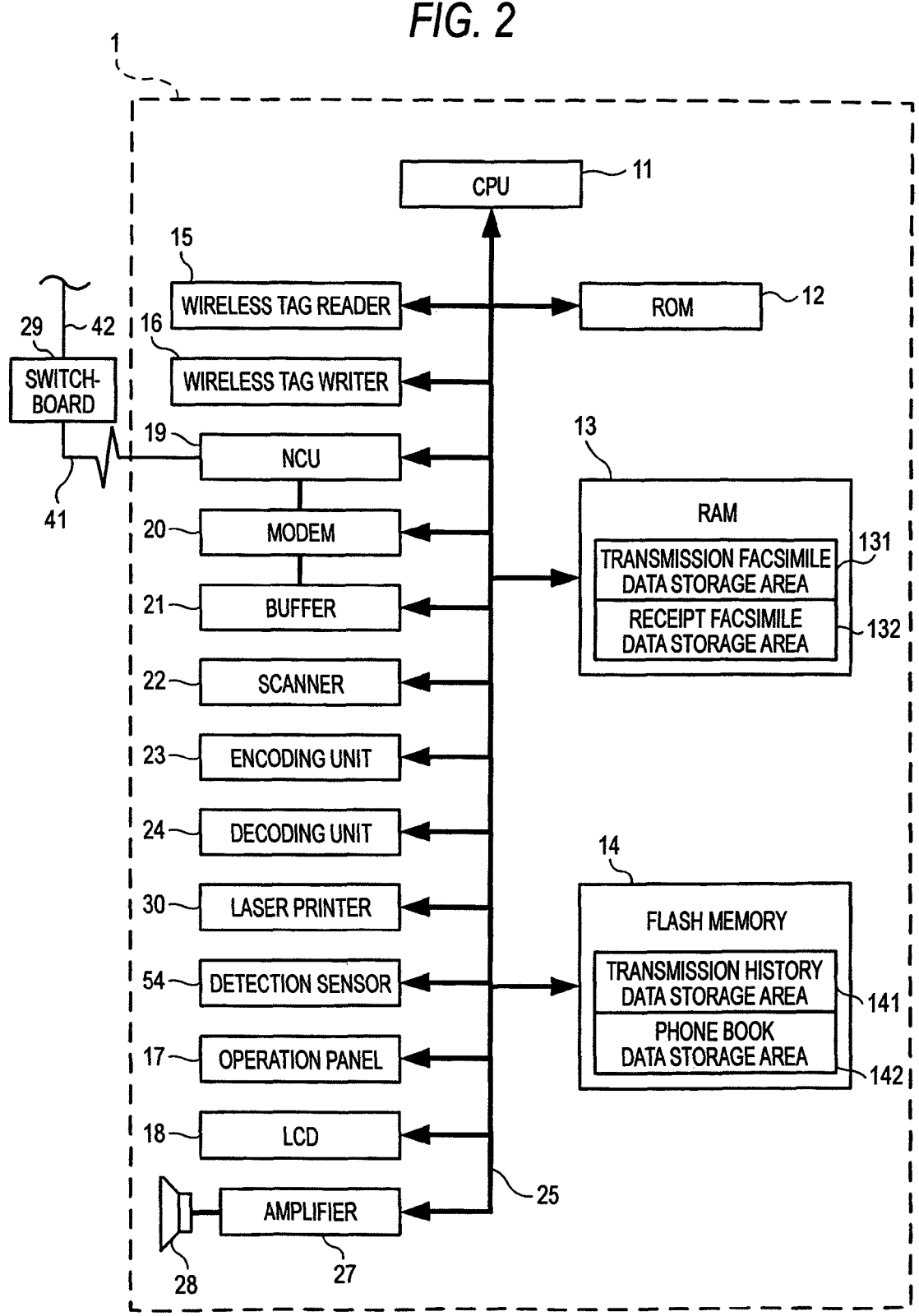
FIG. 2 is a block diagram showing a control system configuration of the facsimile apparatus.

Next, a control system configuration of the facsimile apparatus 1 according to this exemplary embodiment will be described in detail with reference to the drawings. FIG. 2 is a block diagram showing the control system configuration of the facsimile apparatus 1.

The facsimile apparatus 1 includes a central processing unit (CPU) 11, a read only memory (ROM) 12, a random access memory (RAM) 13, and a flash memory 14. Along with various peripherals of a network control unit (NCU) 19, and the like, these are connected to each other through a bus line 25.

The CPU 11 of the facsimile apparatus 1 performs a facsimile operation, that is, data communication, by controlling device components connected by the bus line 25 according to various signals transmitted and received through the NCU 19 to perform line control. The ROM 12 is a non-rewritable memory which stores control programs to be executed in the facsimile apparatus 1. The ROM 12 stores various control programs of a main control process program (see FIG. 6), a set original document registration transmission process program (see FIG. 8), a page sequence check transmission process program (see FIG. 12), a page sequence non-check transmission process program (see FIG. 15), and the like to be described later.

The RAM 13 is a memory to temporarily store various data when the facsimile apparatus 1 is in operation. For example, the RAM 13 temporarily stores a count result of the number of matches in a number-of-matches addition process (S29 and S47) in the page sequence check process program (see FIG. 12) and the page sequence non-check transmission process program (see FIG. 15) to be described later.

The RAM 13 includes a transmission facsimile data storage area 131 and a receipt facsimile data storage area 132. The transmission facsimile data storage area 131 is a storage area in which original document data configured by image data of an original document acquired by the scanner 22 is stored. The receipt facsimile data storage area 132 is a storage area in which original document data received from another facsimile apparatus 1 is stored temporarily.

The flash memory 14 is a rewritable nonvolatile memory. The flash memory 14 has a transmission history storage area 141 and a phone book data storage area 142.

The transmission history storage area 141 stores transmission history data indicating details related to facsimile transmission. In this exemplary embodiment, the transmission history data stored in the transmission history storage area 141 is configured by destination data, date-time data, and number-of-sheets data (see FIG. 10). Detailed content of the transmission history data will be described in detail later.

The phone book data storage area 142 is a storage area to store destination data capable of identifying a destination (for example, a destination device) of the facsimile transmission or call (for example, a phone number or facsimile number, and the like). In the facsimile apparatus 1, the user can make a call to the destination in facsimile transmission and in calling by using the destination data stored in the phone book data storage area 142.

As shown in FIG. 2, the facsimile apparatus 1 includes the NCU 19, the wireless tag reader 15, the wireless tag writer 16, a modem 20, a buffer 21, the scanner 22, an encoding unit 23, a decoding unit 26, the laser printer 30, the detection sensor 54, an operation panel 17, an LCD 18, and an amplifier 27 as peripherals. These peripherals are also connected to each other through the bus line 25.

As described above, the wireless tag reader 15 reads data (for example, identification data to be described later, and the like) stored in the wireless tag of an original document. The wireless tag writer 16 writes data (for example, identification data to be described later, and the like) to the wireless tag.

The NCU 19 performs a communication control process of a connection and disconnection of a line to a switchboard 29. The modem 20 modulates and demodulates original document data and to transmit and receive various sequence signals for transmission control. The buffer 21 temporarily stores data including encoded original document data in transmission to and receipt from a counterpart facsimile apparatus.

As described above, the scanner 22 configures a part of the scanner unit 3. The scanner 22 reads an original document fed on a page-by-page basis from the original document mounting unit 2A and generates image data on a page-by-page basis. The image data read by the scanner 22 configures original document data to be facsimiled later. The image data read by the scanner 22 is stored in the transmission facsimile data storage area 131.

The encoding unit 23 encodes original document data in facsimile transmission. The decoding unit 24 reads and decodes received data stored in the buffer 21.

As described above, the laser printer 30 prints image data decoded by the decoding unit 24 on a recording sheet stored in the first to third sheet-feeding trays 51 to 53.

The detection sensor 54 is a sensor that is provided to the first to third sheet-feeding trays 51 to 53 and detects the presence or absence of the wireless tag in a recording sheet stored in each sheet-feeding tray.

The operation panel 17 is an operation unit including a plurality of keys. Specifically, the operation panel 17 includes a plurality of numeric keys or cursor keys, a start key, and the like. When an operation to each key configuring the operation panel 17 is performed, an input signal is transmitted to the CPU 11 and control based on the input signal is performed. For example, the operation panel 17 is used when selecting and setting a transmission mode in facsimile transmission (S1) or when inputting a destination number (that is, a facsimile number) of facsimile transmission (S11, S21, and S41). The operation panel 17 is used when selecting whether to perform facsimile transmission in the page sequence check process program (see FIG. 12) and the page sequence non-check transmission process program (see FIG. 15).

Figure 13:
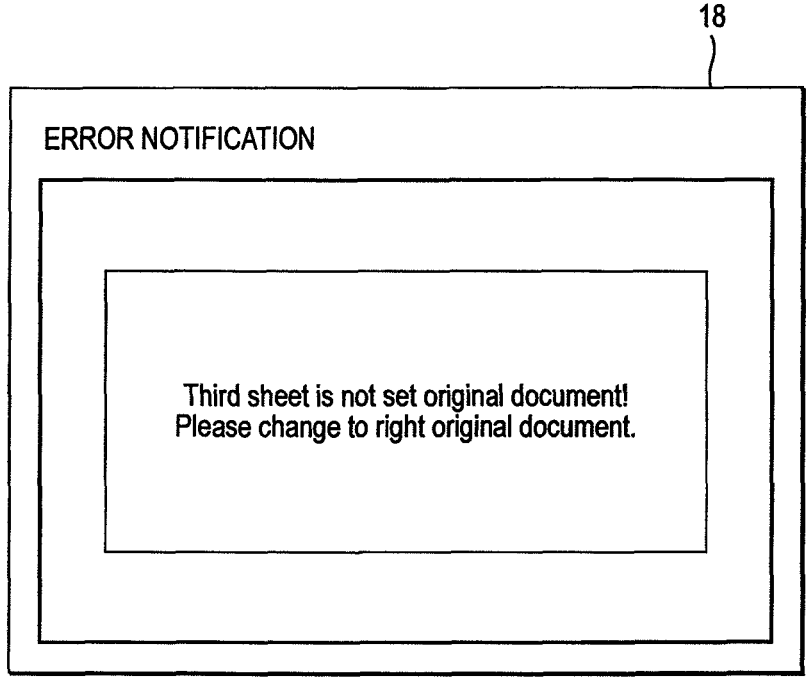
FIG. 13 is an illustrative view showing a display example of an error notification screen (set original document error notification screen)
Figure 14:
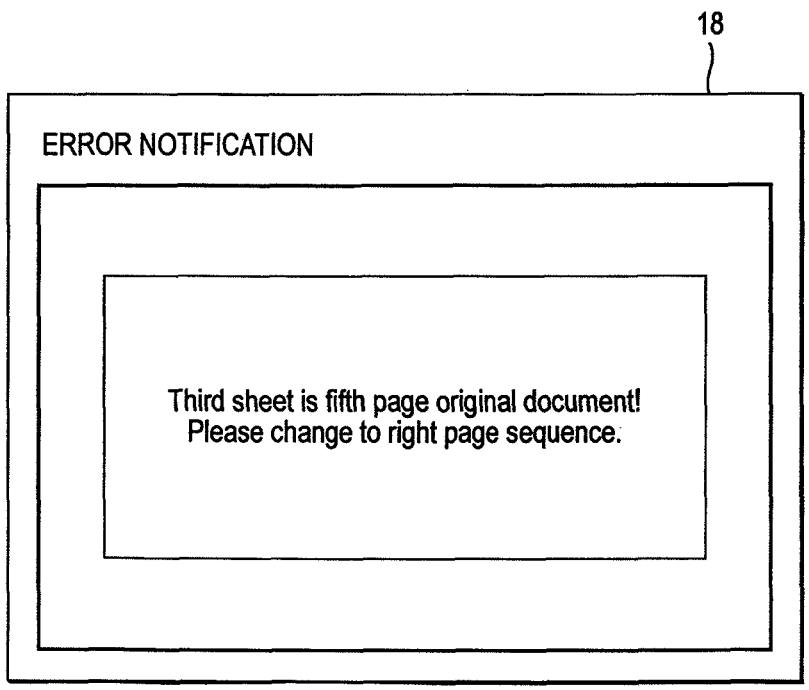
FIG. 14 is an illustrative view showing a display example of an error notification screen (page sequence error notification screen)

The LCD 18 is a display device configured with a liquid crystal display. Various display operations related to the facsimile apparatus 1 are performed on the LCD 18 under control of the CPU 11. For example, a FAX transmission history list screen (see FIG. 10) is displayed on the LCD 18 on the basis of storage content of the transmission history storage area 141. The LCD 18 displays a transmission mode setting screen (see FIG. 7), an error notification screen (see FIGS. 13 and 14), and an extraction result notification screen (see FIGS. 16 and 17).

A speaker 28 is connected to the amplifier 27 and a ringing tone is output from the speaker 28.

The facsimile apparatus 1 is connected to the switchboard 29 through the NCU 19 and a telephone line 41. The switchboard 29 is connected to a switchboard (not shown) of a counterpart device through a telephone line 42 and further connected to a counterpart device (not shown) through a telephone line (not shown). Accordingly, the facsimile apparatus 1 can perform facsimile transmission of original document data to the counterpart device through the telephone line 41, the switchboard 29, the telephone line 42 and the like.

Figure 3:
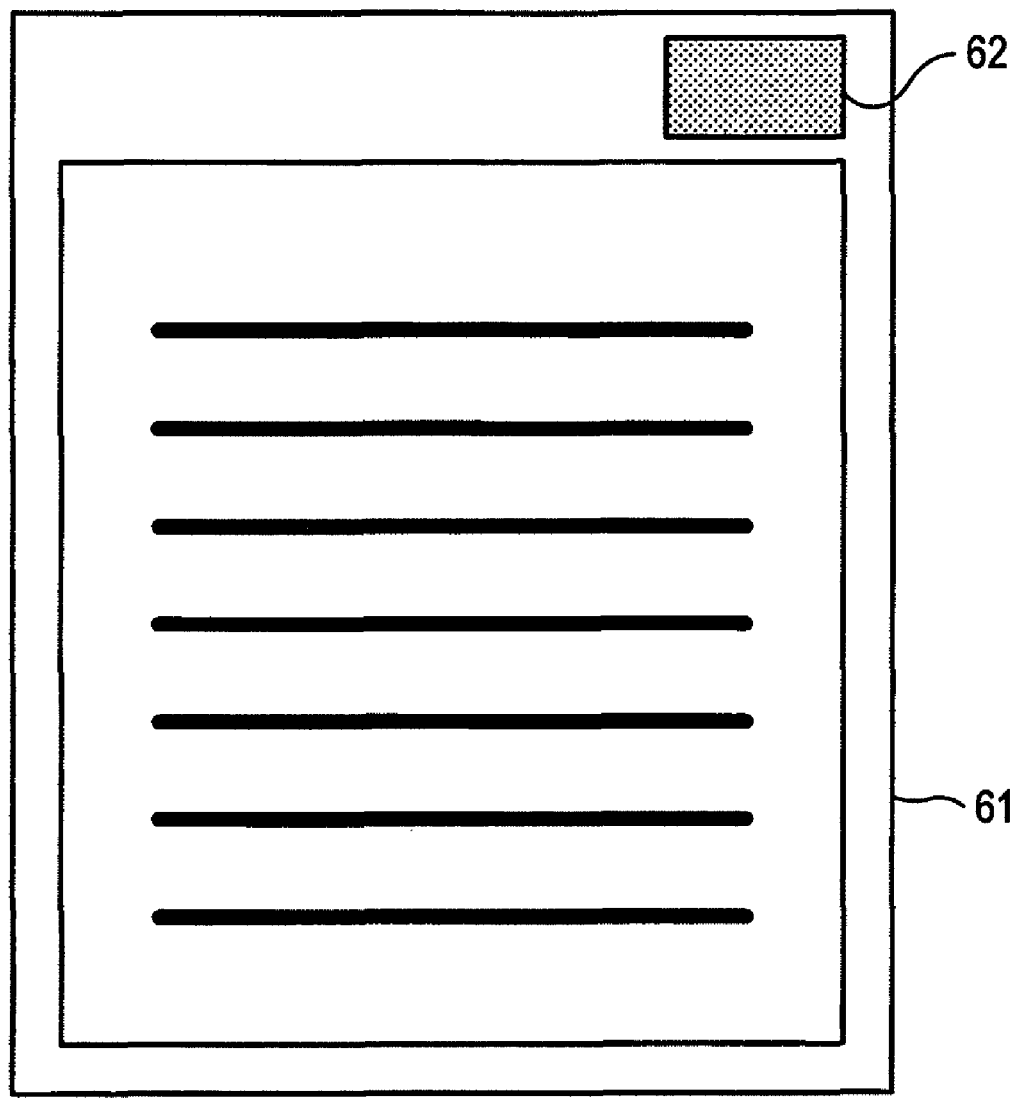
FIG. 3 is an illustrative view of a transmission original document used in the facsimile apparatus.

Next, a configuration of a transmission original document 61 used in the facsimile apparatus 1 according to this exemplary embodiment will be described in detail with reference to the drawings. FIG. 3 is an illustrative view showing a configuration of the transmission original document 61.

User-desired content as a facsimile transmission target is printed on the transmission original document 61 used in the facsimile apparatus 1 according to this exemplary embodiment. Accordingly, the facsimile apparatus 1 can generate original document data corresponding to the content of the transmission original document 61 by reading print content of the transmission original document 61 using the scanner 22.

A wireless tag 62 to be described later is attached to the transmission original document 61. When the transmission original document 61 is facsimiled based on a set original document registration transmission process program (see FIG. 8) to be described later, identification data to be described later is written to the wireless tag 62 attached to the transmission original document 61.

Next, an operation for the transmission original document 61 in facsimile transmission by the facsimile apparatus 1 will be described.

First, the user sets a transmission original document 61 on the original document mounting unit 2A and operates a start key (not shown) of the operation panel 17 to designate a condition of a destination, and the like. Herein, the number of sheets of the transmission original document 61 is not concerned. When the start key is input, the automatic original document feeder 2 conveys the transmission original document 61 set on the original document mounting unit 2A to a read position of the scanner unit 3 on a page-by-page basis.

Here, a data read position by the wireless tag reader 15 and a data write position by the wireless tag writer 16 are arranged on a movement path of the transmission original document 61, along which the transmission original document 61 moves relative to the scanner 22 of the scanner unit 3 (see FIG. 1). Accordingly, in a process in which the automatic original document feeder 2 conveys the transmission original document 61 to the read position of the scanner 22, the wireless tag writer 16 can write data (for example, identification data to be described later) to the wireless tag attached to the transmission original document 61. Similarly, in a process in which the transmission original document 61 is conveyed to the read position of the scanner 22, the wireless tag reader 15 can read data (for example, identification data to be described later) stored in the wireless tag 62 attached to the transmission original document 61.

As a result, in the facsimile apparatus 1, the wireless tag writer 16 can write data to the wireless tag 62 attached to the transmission original document 61 substantially simultaneously with reading image data of the transmission original document 61 by the scanner 22. Similarly, in the facsimile apparatus 1, the wireless tag reader 15 can read data from the wireless tag 62 substantially simultaneously with reading image data from the transmission original document 61.

Next, configurations of the wireless tag 62, the wireless tag reader 15, and the wireless tag writer 16 according to this exemplary embodiment will be described in detail with reference to the drawings.

Figure 4:
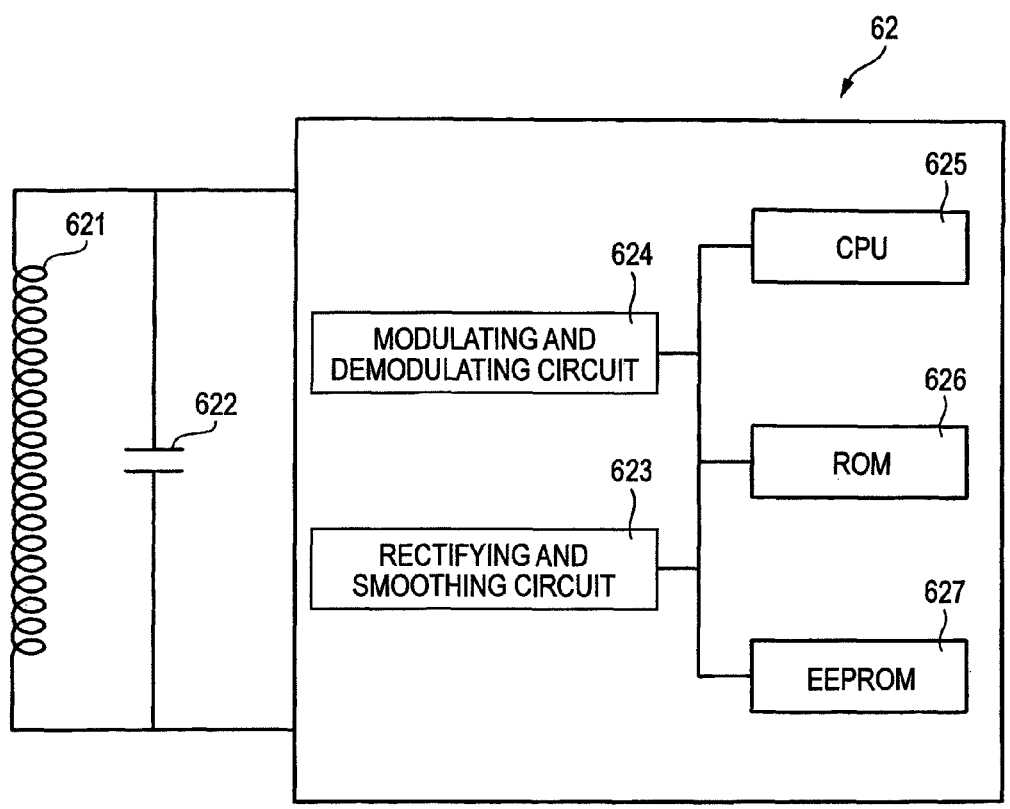
FIG. 4 is a block diagram showing a configuration of a wireless tag attached to the transmission original document.

First, the configuration of the wireless tag 62 will be described. As shown in FIG. 4, the wireless tag 62 includes an antenna coil 621, a resonance condenser 622, a rectifying and smoothing circuit 623, a modulating and demodulating circuit 624, a CPU 625, a ROM 626, and an EEPROM 627.

The antenna coil 621 configures a resonating circuit connected to the resonance condenser 622 in parallel and supplies a power radio wave signal to the rectifying and smoothing circuit 623 by receiving power radio wave vibration of a predetermined high frequency transmitted from the wireless tag reader 15 or the wireless tag writer 16.

The rectifying and smoothing circuit 623 is a circuit configuring a power supply circuit. The rectifying and smoothing circuit 623 supplies direct current power of a fixed voltage to the CPU 625 by rectifying and smoothing a power radio wave signal transmitted from the resonating circuit.

A transmission signal from the wireless tag reader 15 or the wireless tag writer 16 is transmitted by overlapping with the power radio wave signal. The transmission signal is demodulated by the modulating and demodulating circuit 624 and provided to the CPU 625.

The CPU 625 operates according to an operating program stored in the ROM 626 and executes a predetermined process in response to a signal from the modulating/demodulating circuit 624. That is, the CPU 625 executes a write process for writing received data (for example, identification data to be described later) to the EEPROM 627 or a read process for transmitting a radio wave signal by the antenna coil 621 after reading data (for example, identification data to be described later) stored in the EEPROM 627 and modulating the data by the modulating/demodulating circuit 624.

In the wireless tag 62, the rectifying and smoothing circuit 623, the modulating and demodulating circuit 624, the CPU 625, the ROM 626, and the EEPROM 627 are configured into an IC chip and embedded into a recording sheet along with the antenna coil 621 and the resonance condenser 622.

Next, configurations of the wireless tag reader 15 and the wireless tag writer 16 according to this exemplary embodiment will be described in detail with reference to the drawings.

Figure 5:
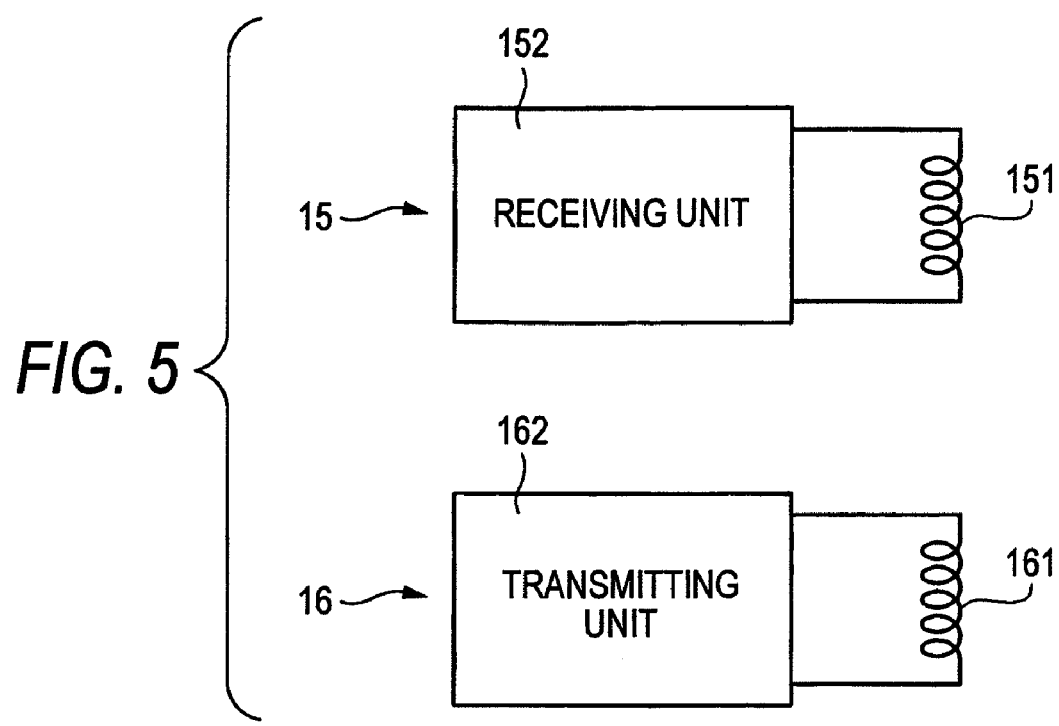
FIG. 5 is a block diagram showing configurations of a wireless tag reader and a wireless tag writer.

As shown in FIG. 5, the wireless tag reader 15 is configured with a receive antenna coil 151 and a receiving unit 152. The wireless tag reader 15 can receive a radio wave signal transmitted from the wireless tag 62 using the receive antenna coil 151. The wireless tag reader 15 demodulates the radio wave signal received by the receive antenna coil 151 using the receiving unit 152. Thereby, the wireless tag reader 15 can read data (for example, identification data) from the wireless tag 62.

The wireless tag writer 16 is configured with a transmit antenna coil 161 and a transmitting unit 162. The wireless tag writer 16 can modulate a carrier signal in the transmitting unit 162 and transmit a power radio wave signal from the transmit antenna coil 161. The wireless tag writer 16 can modulate data to be transmitted in the transmitting unit 162 such that the data overlaps with the power radio wave signal, thereby transmitting the signal from the transmit antenna coil 161. Thereby, the wireless tag writer 16 can write data (for example, identification data) to the wireless tag 62.

Figure 6:
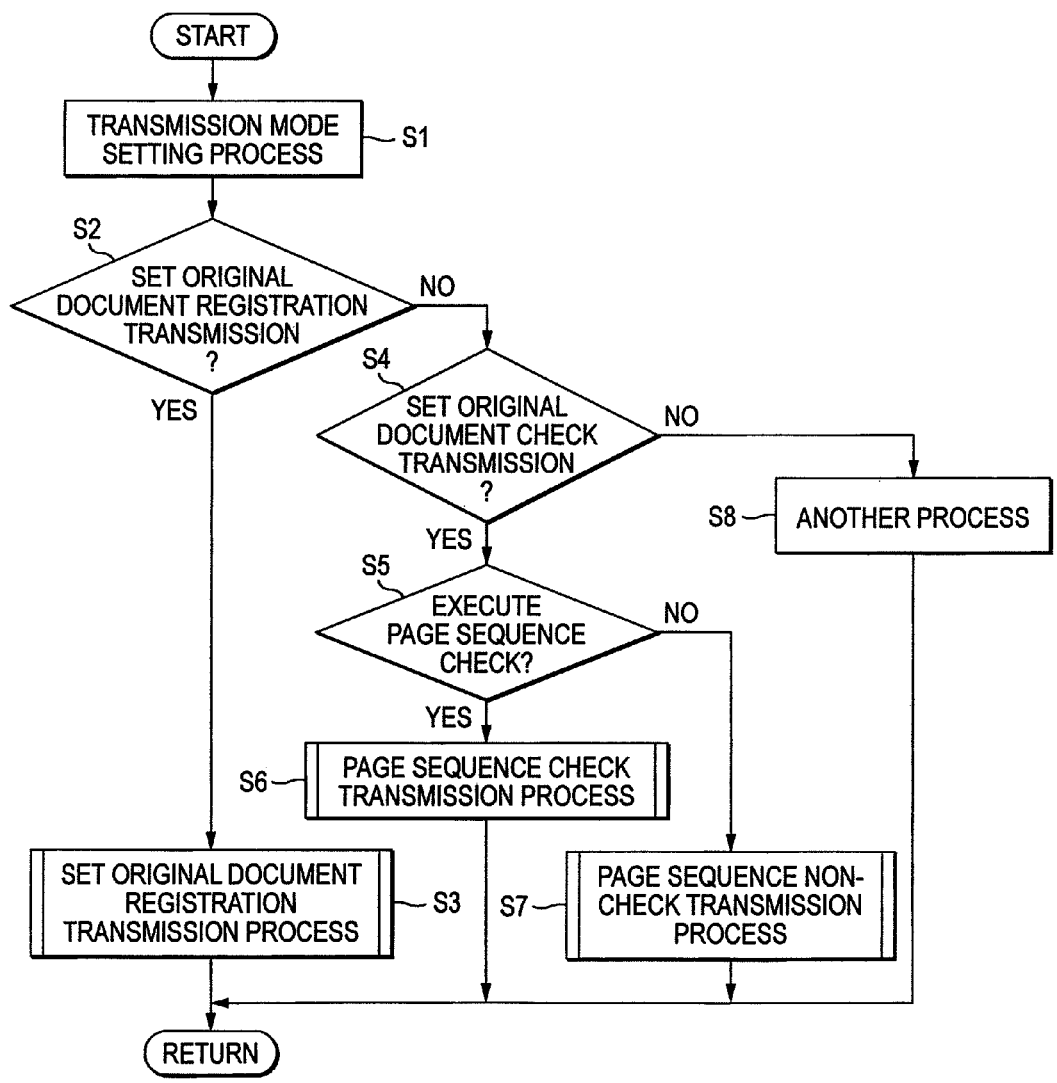
FIG. 6 is a flowchart of a main control program according to the exemplary embodiment.

Next, a main control program to be executed in the facsimile apparatus 1 according to this exemplary embodiment will be described in detail with reference to the drawings. FIG. 6 is a flowchart of the main control program according to this exemplary embodiment. A process based on the main control program is repeatedly executed in operation of the facsimile apparatus 1. In a description of the main control program, it is assumed that an original document of a facsimile transmission target is mounted on the original document mounting unit 2A of the facsimile apparatus 1. As an original document of a facsimile transmission target, an original document to which the wireless tag 62 is not attached can be also used as well as a transmission original document 61 shown in FIG. 3.

When the main control program starts, the CPU 11 first executes a transmission mode setting process S1. The transmission mode setting process S1 is a process in which the user arbitrarily selects and sets a facsimile transmission mode in the facsimile apparatus 1. Specifically, the CPU 11 displays a transmission mode setting screen (see FIG. 7) on the LCD 18.

Figure 7:
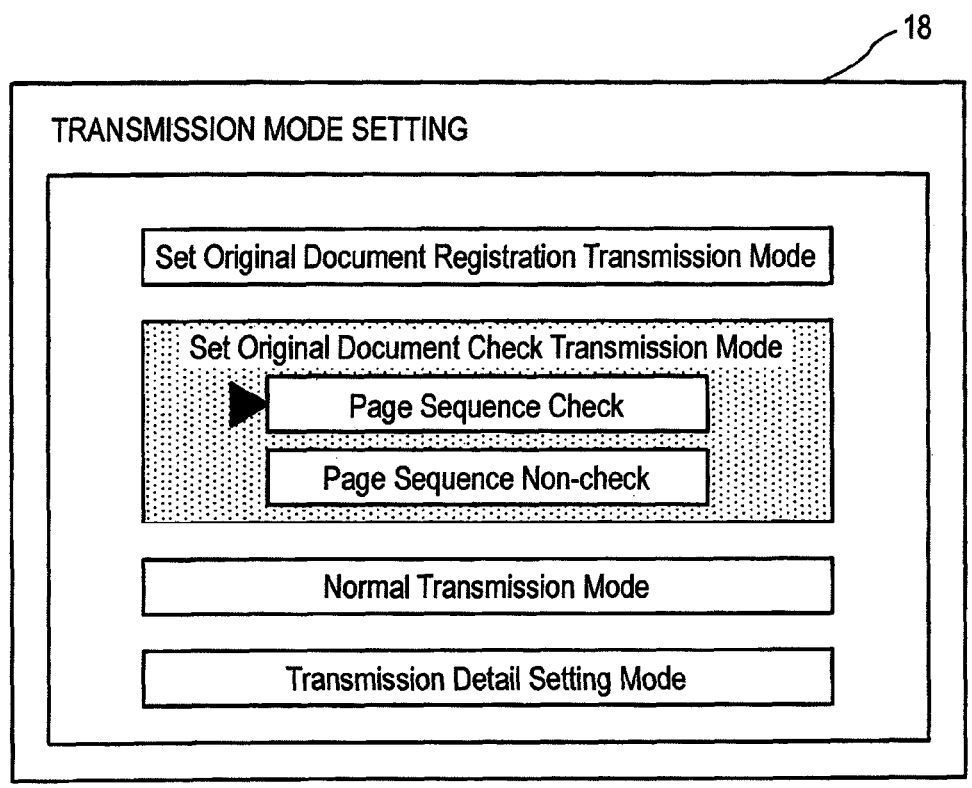
FIG. 7 is an illustrative view showing a display example of a transmission mode setting screen.

As shown in FIG. 7, the LCD 18 displays four options in the transmission mode setting screen. The four options are "set original document registration transmission mode", "set original document check transmission mode", "normal transmission mode", and "transmission detail setting mode". Further, the LCD 18 displays two options, "page sequence check" and "page sequence non-check" related to detailed setting of the "set original document check transmission mode" in the transmission mode setting screen.

The user operates the operation panel 17 while viewing the transmission mode setting screen (see FIG. 7) and selects a desired transmission mode in relation to facsimile transmission. Thereby, in the transmission mode setting process S1, the user can desirably set a mode of facsimile transmission to be performed later. On the basis of an operation of the user using the operation panel 17, the CPU 11 stores a selection result of the user in the RAM 13 and ends the transmission mode setting process. When the transmission mode setting process S1 ends, the CPU 11 shifts the process to S2.

In S2, the CPU 11 determines whether the "set original document registration transmission mode" is set by the transmission mode setting process S1. Specifically, the CPU 11 refers to the selection result stored in the RAM 13 and performs the determination of S2. When the "set original document registration transmission mode" is selected and set (S2: YES), the CPU 11 shifts the process to S3. On the other hand, when the "set original document registration transmission mode" is not selected and set (S2: NO), the CPU 11 shifts the process to S4.

In S3, the CPU 11 executes a set original document registration transmission process. In the set original document registration transmission process S3, the CPU 11 executes a set original document registration transmission process program (see FIG. 8). That is, the CPU 11 facsimiles the transmission original document 61 mounted on the original document mounting unit 2A to a user-desired transmission destination on the basis of the set original document registration transmission process program (see FIG. 8). At this time, the CPU 11 writes identification data to be described later to the wireless tag 62 of each transmission original document 61 as a facsimile transmission target. Details of the set original document registration transmission process S3 will be described in detail with reference to the drawings. When the set original document registration transmission process S3 ends, the CPU 11 ends the main control program. Then, the CPU 11 starts to re-execute the main control program.

In this exemplary embodiment, the transmission original document 61 transmitted in one communication based on the set original document registration transmission process S3 is referred to as a "set original document". It is assumed that the set original document is configured with multiple sheets of transmission original document 61. However, the set original document may be configured with one sheet of the transmission original document 61.

In S4, the CPU 11 determines whether the "set original document check transmission mode" is set by the transmission mode setting process S1. Specifically, the CPU 11 refers to the selection result stored in the RAM 13 and performs the determination of S4. When the "set original document check transmission mode" is selected and set (S4: YES), the CPU 11 shifts the process to S5. On the other hand, when the "set original document check transmission mode" is not selected and set (S4: NO), the CPU 11 shifts the process to S8. In this exemplary embodiment, the process proceeds to S8 if the "normal transmission mode" or "transmission detail setting mode" is selected.

In S5, the CPU 11 determines whether the "page sequence check" is set as details of the "set original document registration transmission mode" by the transmission mode setting process S1. Specifically, the CPU 11 refers to the selection result stored in the RAM 13 and performs the determination of S5. When the "page sequence check" is selected and set (S5: YES), the CPU 11 shifts the process to a page sequence check transmission process S6. On the other hand, when the "page sequence non-check" is selected and set (S5: NO), the CPU 11 shifts the process to a page sequence non-check transmission process S7.

In S6, the CPU 11 executes the page sequence check transmission process. In the page sequence check transmission process S6, the CPU 11 executes a page sequence check transmission process program. By the page sequence check transmission process S6, an original document (that is, a set original document) transmitted in the set original document registration transmission process S3 is transmitted to a transmission destination in the same page sequence as previous transmission. When the page sequence check transmission process S6 ends, the CPU 11 ends the main control program. The CPU 11 starts to re-execute the main control program. The page sequence check transmission process program will be described in detail with reference to the drawings.

On the other hand, in S7, the CPU 11 executes the page sequence non-check transmission process. In the page sequence non-check transmission process S7, the CPU 11 executes a page sequence non-check transmission process program. By the page sequence non-check transmission process S7, the same original document as the above-described set original document is transmitted to a desired transmission destination. In this regard, in the page sequence non-check transmission process S7, it is not considered whether the page sequence is same as previous transmission. When the page sequence non-check transmission process S7 ends, the CPU 11 ends the main control program. Also in this case, the CPU 11 starts to re-execute the main control program. The page sequence non-check transmission process program will be described in detail with reference to the drawings.

When the "normal transmission mode" or "transmission detail setting mode" is selected in the transmission mode setting process S1 (S2: NO and S4: NO), the CPU 11 executes another process S8. In the process S8, the CPU 11 executes various processes in response to setting content by the transmission mode setting process S1.

For example, when the "normal transmission mode" is set, the CPU 11 performs a process related to normal facsimile transmission. That is, the CPU 11 acquires original document data without acquiring and writing data for the wireless tag 62, and transmits the original document data to a transmission destination. When the "transmission detail setting mode" is set, a process related to detailed setting according to facsimile transmission is performed. In this case, the CPU 11 performs detailed setting of image quality of original document data to be transmitted on the basis of an operation of the user using the operation panel 17. When the process S8 ends, the CPU 11 ends the main control program. In this case also, the CPU 11 starts to re-execute the main control program.

Figure 8:
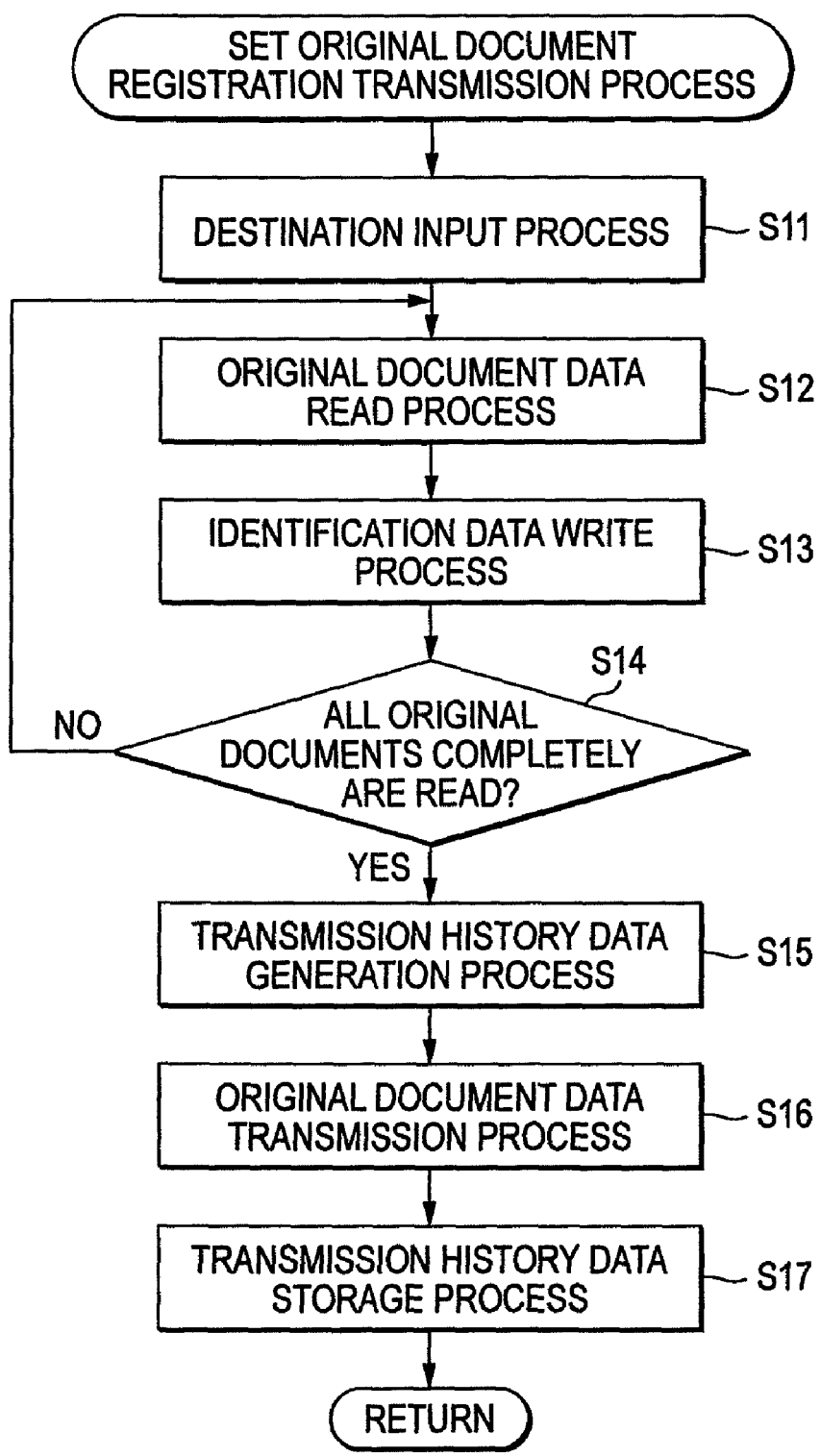
FIG. 8 is a flowchart of a set original document registration transmission process program.

Next, the set original document registration transmission process program according to this exemplary embodiment will be described in detail with reference to the drawings. FIG. 8 is a flowchart of the set original document registration transmission process program. As described above, the set original document registration transmission process program is executed by the CPU 11 in the set original document registration transmission process S3.

In the set original document registration transmission process S3, the CPU 11 first executes a destination input process S11. In the destination input process S11, the user operates the operation panel 17 and inputs a destination (for example, a facsimile number) of the transmission original document 61 mounted on the original document mounting unit 2A. The CPU 11 stores destination data based on an input signal from the operation panel 17 in the RAM 13. After the destination data is stored in the RAM 13, the CPU 11 shifts the process to an original document data read process S12.

In S12, the CPU 11 executes the original document data read process. In the original document data read process S12, the CPU 11 reads one page of the transmission original document 61 from the transmission original document 61 mounted on the original document mounting unit 2A using the scanner unit 3. The CPU 11 stores read image data as original document data of one page in the transmission facsimile data storage area 131. When the original document data read process S12 for a first page of the transmission original document 61 mounted on the original document mounting unit 2A is executed, the CPU 11 stores a read date and time when the first page of the transmission original document 61 is read as date-time data in the RAM 13. After the original document data of one page is stored in the transmission facsimile data storage area 131, the CPU 11 shifts the process to S13.

In S13, the CPU 11 executes an identification data write process. In this identification data write process S13, the CPU 11 writes identification data to the wireless tag 62 attached to the one page of the transmission original document 61 read in the original document data read process S12 using the wireless tag writer 16. After the identification data is written to the wireless tag 62 of the transmission original document 61, the CPU 11 shifts the process to S14.

Here, the identification data written to the wireless tag 62 in the identification data write process S13 will be described with reference to the drawings.

Figure 9:
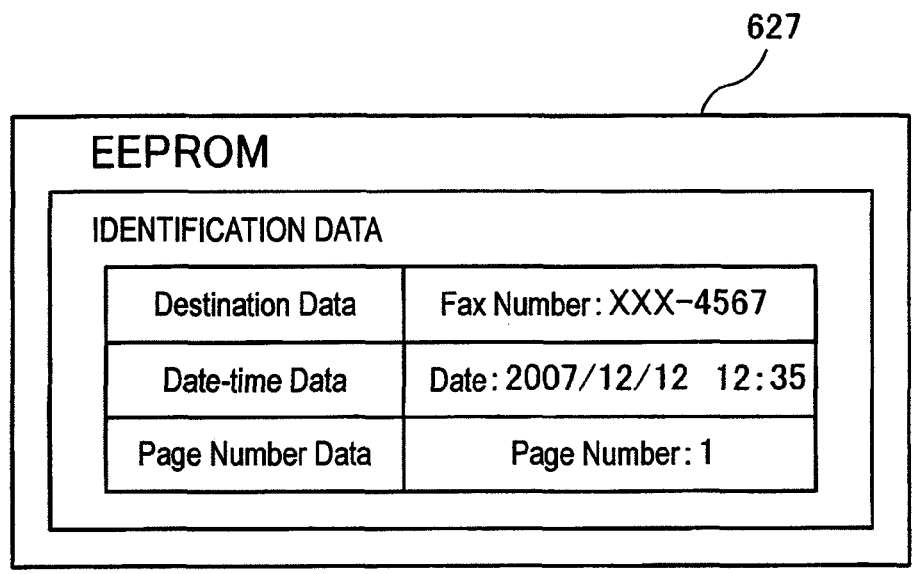
FIG. 9 is an illustrative view showing a configuration of identification data written to a wireless tag.

As shown in FIG. 9, the identification data is configured by destination data, date-time data, and page number data. The destination data indicates a transmission destination of facsimile transmission based on the transmission original document 61. The destination data is generated based on content input in the destination input process S11 and stored in the RAM 13. For example, data indicating a facsimile number input in the destination input process S11 corresponds to the destination data (see FIG. 9).

The date-time data indicates a date and time of a process related to the facsimile transmission based on the transmission original document 61. The date-time data of this exemplary embodiment indicates a date and time of reading the original document data of the transmission original document 61 of a first page in the facsimile transmission like "2007/12/12 12:35" (see FIG. 9). As described above, the date-time data is stored in the RAM 13 in the original document data read process S12.

In facsimile transmission based on the transmission original document 61, the page number data indicates a sequence in which one page of the transmission original document 61 as a present target is transmitted to the destination. In this regard, in the set original document registration transmission process S3, the CPU 11 transmits the original document data from the transmission original document 61 to a transmission destination in a read sequence. Accordingly, the page number data is also associated with a sequence in which the scanner unit 3 reads one page of the transmission original document 61. For example, in facsimile transmission, page number data of a first read transmission original document 61 indicates "page number: 1" (see FIG. 9). When multiple sheets of transmission original document 61 are mounted on the original document mounting unit 2A, a number indicated by the page number data is sequentially incremented by 1 whenever the process (S12 and S13) for one page of the transmission original document 61 ends.

That is, when the original document data related to one page of the transmission original document 61 is stored in the transmission facsimile data storage area 131 by the original document data read process S12, the CPU 11 writes data based on storage content of the RAM 13 as identification data to the wireless tag 62 of the transmission original document 61. Specifically, the CPU 11 writes the destination data, the date-time data, and the page number data stored in the RAM 13 as the identification data to the EEPROM 627 of the wireless tag 62 in the transmission original document 61 using the wireless tag writer 16. As a result, when multiple pages of the transmission original document 61 exist, the destination data and the date-time data among the identification data written to the wireless tag 62 are common among the identification data of all pages of the transmission original document 61 and only the page number data is updated according to a page sequence.

In S14, the CPU 11 determines whether the process of S12 and S13 for all pages of the transmission original document 61 is completed. Specifically, the CPU 11 determines whether the transmission original document 61 exists on the original document mounting unit 2A. When the process (S12 and S13) for all pages of the transmission original document 61 is completed and the transmission original document 61 does not exist on the original document mounting unit 2A (S14: YES), the CPU 11 shifts the process to S15. On the other hand, when the process for all pages of the transmission original document 61 is not completed and the transmission original document 61 exists on the original document mounting unit 2A (S14: NO), the CPU 11 returns the process to S12. In this case, the CPU 11 executes the process (S12 and S13) for the transmission original document 61 of the next page present on the original document mounting unit 2A.

In S15, the CPU 11 executes a transmission history data generation process. In this transmission history data generation process S15, the CPU 11 generates transmission history data related to the facsimile transmission of the transmission original document 61. Specifically, the CPU 11 generates the transmission history data based on the destination data, the date-time data, and the like stored in the RAM 13. After the generated transmission history data is stored in the RAM 13, the CPU 11 shifts the process to S16.

Figure 10:
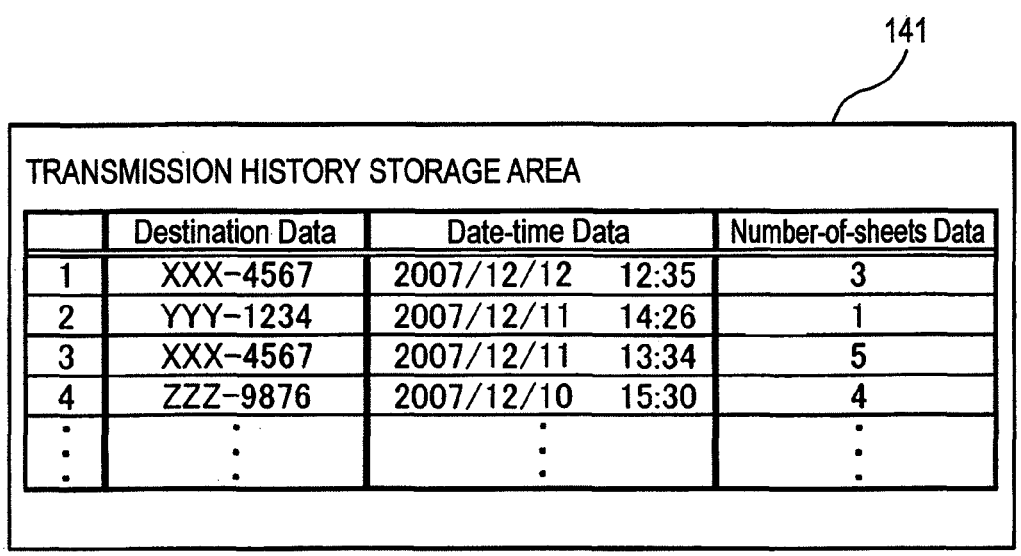
FIG. 10 is an illustrative view showing transmission history data within a transmission history storage area.

Here, the transmission history data is configured by destination data, date-time data, and number-of-sheets data (see FIG. 10). The destination data and the date-time data configuring the transmission history data indicate the same content as the destination data and the date-time data of the identification data written to the wireless tag 62 of the transmission original document 61 in the identification data write process S13. The number-of-sheets data indicates the number of sheets (pages) of transmission original document 61 to be transmitted in the facsimile transmission. Specifically, a numerical value indicated by the page number data in S15 corresponds to a value of number-of-sheets data. Accordingly, the CPU 11 generates the transmission history data related to the facsimile transmission based on the destination data and the date-time data stored in the RAM 13 and the number-of-sheets data based on the page number data in S15.

In S16, the CPU 11 executes an original document data transmission process. In the original document data transmission process S16, the CPU 11 facsimiles original document data within the transmission facsimile data storage area 131 to a destination designated in the destination input process S11. Here, the original document data to be transmitted is image data based on all pages of the transmission original document 61 read by the process of S12 to S14. The original document data is facsimiled to the destination in one communication. When the original document data transmission process S16 ends, the CPU 11 shifts the process to S17.

In S17, the CPU 11 executes a transmission history data storage process. In this transmission history data storage process S17, the CPU 11 stores transmission history data generated by the transmission history data generation process S15 in the transmission history storage area 141. The CPU 11 reads the transmission history data generated by the transmission history data generation process S15 from the RAM 13 and stores the transmission history data in the transmission history storage area 141 every facsimile transmission (see FIG. 10). After the transmission history data is stored in the transmission history storage area 141, the CPU 11 ends the set original document registration transmission process program.

Figure 11:
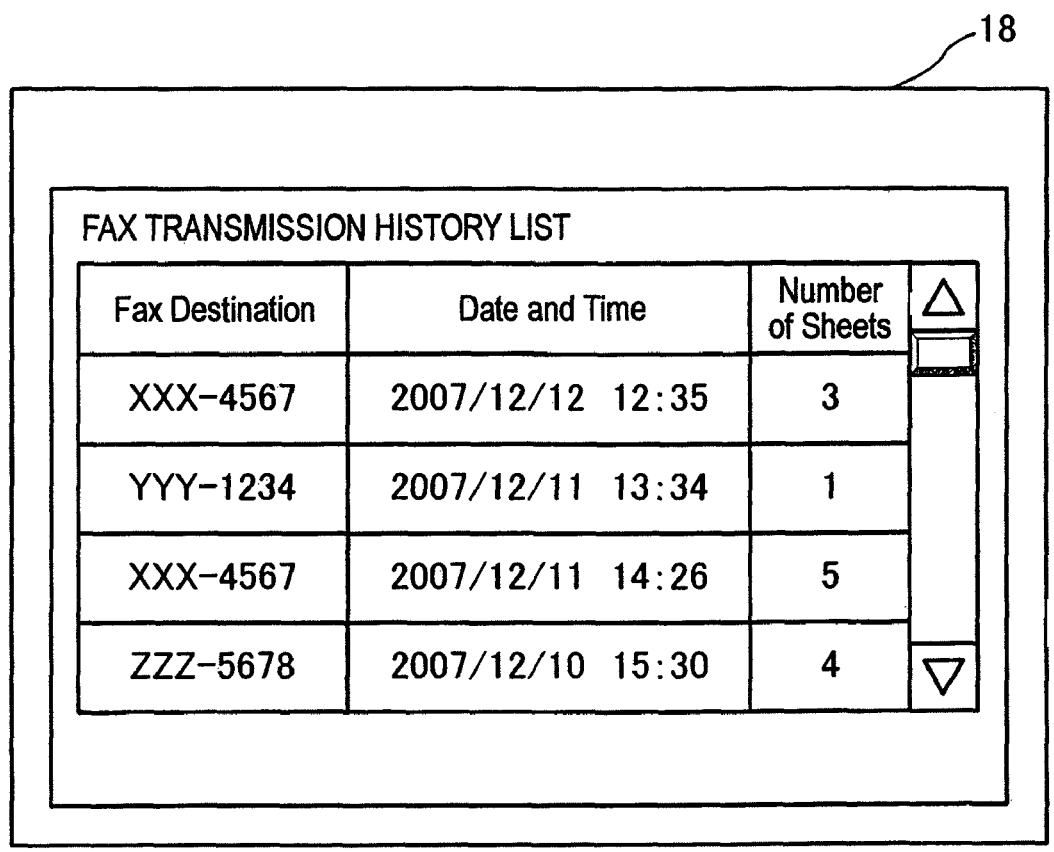
FIG. 11 is an illustrative view showing a display example of a FAX transmission history list screen.

In this exemplary embodiment, the content of the transmission history data stored in the transmission history storage area 141 can be referred to by a FAX transmission history list screen (see FIG. 11) displayed on the LCD 18.

The transmission original document 61 transmitted in one transmission configures one set original document by the set original document registration transmission process program. At least the date-time data in the identification data is different between the set original document and a set original document separately transmitted by the set original document registration transmission process program. Accordingly, even when multiple set original documents are mixed, the transmission original documents 61 configuring both the set original documents can be discriminated by referring to the identification data written to the wireless tag 62.

Here, the "set original document check transmission mode" in the facsimile apparatus 1 according to this exemplary embodiment will be described. In the "set original document check transmission mode", the CPU 11 checks whether the transmission original document 61 as a facsimile transmission target is the same as a set original document transmitted previously based on the set original document registration transmission process program. That is, it is checked whether a combination of pages of the transmission original document 61 is same as a combination of pages of the set original document transmitted previously. When the transmission original document 61 is same as the set original document, the facsimile transmission based on the transmission original document 61 is performed to a user-desired destination.

As described above, in the "set original document check transmission mode", two transmission modes which are different in whether the "page sequence check" is done are provided as transmission modes. That is, one transmission mode of the "set original document check transmission mode" is "page sequence check transmission". In the "page sequence check transmission", the CPU 11 performs the facsimile transmission to a destination by checking whether the transmission original document 61 as the transmission target is same as the previously transmitted set original document and checking whether the transmission original document 61 as the transmission target is read and to be facsimiled as original document data according to a page sequence of the set original document. The other transmission mode of the "set original document check transmission mode" is "page sequence non-check transmission". In the "page sequence non-check transmission", the CPU 11 checks whether the transmission original document 61 as the transmission target is same as the previously transmitted set original document and performs the facsimile transmission to a predetermined destination without checking the page sequence as described above.

Figure 12:
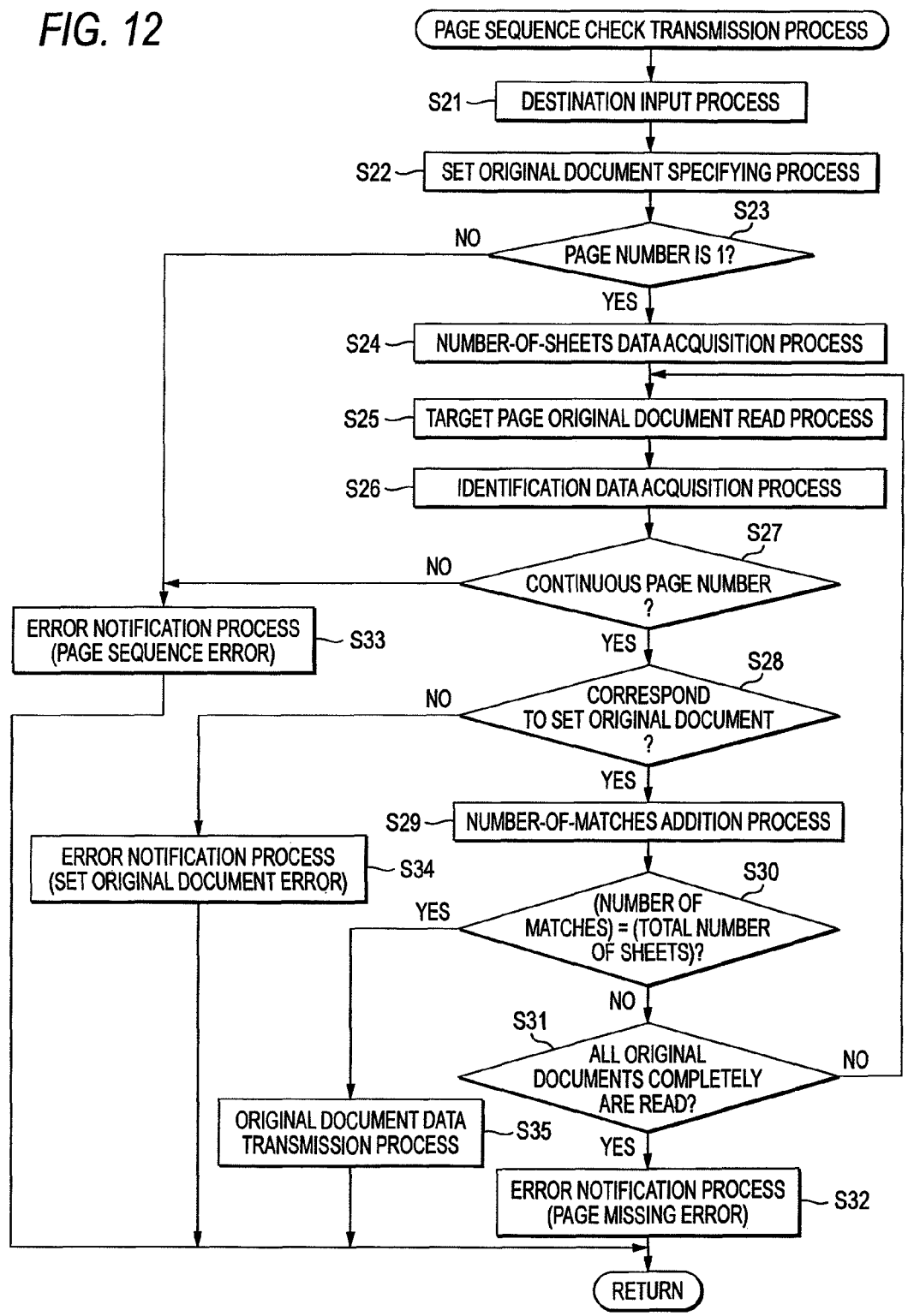
FIG. 12 is a flowchart of a page sequence check transmission process program.

Subsequently, a page sequence check transmission process program according to this exemplary embodiment will be described in detail with reference to the drawings. FIG. 12 is a flowchart of the page sequence check transmission process program. As described above, the CPU 11 executes the page sequence check transmission process program in the page sequence check transmission process S6. In a description of the page sequence check transmission process S6, it is assumed that an original document of multi pages (hereinafter, referred to as a transmission target original document) including the transmission original document 61 (that is, the set original document), which was previously transmitted in the set original document registration process S3 is mounted on the original document mounting unit 2A.

In the page sequence check transmission process S6, the CPU 11 executes a destination input process S21. The destination input process S21 is same as the process of S11. Accordingly, a description of the destination input process S21 is omitted. When the destination input process S21 ends, the CPU 11 shifts the process to S22.

In S22, the CPU 11 executes a set original document specifying process. In the set original document specifying process S22, the CPU 11 specifies a set original document (hereinafter, referred to as a check target set original document) as a check target for checking a combination of pages and a page sequence in the page sequence check transmission process S6. Specifically, the CPU 11 reads original document data from the transmission original document 61, which is a first page of the transmission target original document, using the scanner unit 3. The CPU 11 stores the original document data read by the scanner unit 3 in the transmission facsimile data storage area 131. The CPU 11 acquires identification data from the wireless tag 62 of the first page of the transmission target original document using the wireless tag reader 15 substantially simultaneously with reading the original document data. The CPU 11 stores the acquired identification data in the RAM 13. The CPU 11 can specify the check target set original document by acquiring identification data related to the transmission original document 61, which is a first page of the transmission target original document. When the set original document specifying process S22 ends, the CPU 11 shifts the process to S23.

In S23, the CPU 11 determines whether the transmission original document 61 as a target of the set original document specifying process S22 is an original document corresponding to a first page in the check target set original document on the basis of page number data of the acquired identification data. That is, the CPU 11 performs the determination of S23 based on whether the page number data acquired in the set original document specifying process S22 is "page number: 1". In the case of the first page of the check target set original document (S23: YES), the CPU 11 shifts the process to S24. On the other hand, when the page does not correspond to the first page of the check target set original document (S23: NO), the CPU 11 shifts the process to S33.

In S24, the CPU 11 executes a number-of-sheets data acquisition process. In the number-of-sheets data acquisition process S24, the CPU 11 acquires number-of-sheets data related to the check target set original document from the transmission history storage area 141. Specifically, the CPU 11 specifies transmission history data related to the check target set original document from the transmission history data stored in the transmission history storage area 141 on the basis of the identification data acquired in the set original document specifying process S22. The CPU 11 acquires number-of-sheets data configuring the transmission history data related to the check target set original document and stores the data in the RAM 13. Thereby, the CPU 11 can specify the number of sheets of the check target set original document. After the number-of-sheets data related to the check target set original document is acquired, the CPU 11 shifts the process to S25.

In S25, the CPU 11 executes a target page original document read process. In the target page original document read process S25, the CPU 11 sets the transmission original document 61 of the next sheet among the transmission target original document mounted on the original document mounting unit 2A to a target page original document. The CPU 11 reads original document data from the target page original document using the scanner unit 3. Thereafter, the CPU 11 stores the read original document data in the transmission facsimile data storage area 131. When the original document data is stored and the target page original document read process S25 ends, the CPU 11 shifts the process to S26.

In S26, the CPU 11 executes an identification data acquisition process. In the identification data acquisition process S26, the CPU 11 acquires identification data from the wireless tag 62 attached to the target page original document using the wireless tag reader 15. After the acquired identification data is stored in the RAM 13, the CPU 11 ends the identification data acquisition process S26. After the identification data acquisition process S26 ends, the CPU 11 shifts the process to S27. Here, the identification data acquisition process is executed in S25 whenever the target page original document is read. Accordingly, the identification data corresponding to the number of read target page original document sheets is retained in the RAM 13.

In S27, the CPU 11 determines whether page number data related to the target page original document is continuous to page number data of the identification data acquired immediately before the target page original document. For example, when the page number data of the identification data acquired immediately before the target page original document is "page number: 2", the CPU 11 determines whether the page number data related to the target page original document is "page number: 3". When the page number is continuous (S27: YES), the CPU 11 shifts the process to S28. On the other hand, when the page number is not continuous (S27: NO), the CPU 11 shifts the process to S33.

In S28, the CPU 11 determines whether the target page original document corresponds to the transmission original document 61 included in the check target set original document. Specifically, the CPU 11 performs the determination of S28 by comparing destination data and date-time data of identification data of the target page original document to destination data and date-time data of transmission history data related to the check target set original document. As described above, the destination data and date-time data of the identification data of the check target set original document are the same content as the destination data and date-time data of the transmission history data related to the check target set original document. Accordingly, when both the destination data and the date-time data match, the target page original document is regarded as the transmission original document 61 included in the check target set original document. On the other hand, when any one of the destination data and the date-time data does not match, the target page original document does not correspond to the transmission original document 61 included in the check target set original document. When the target page original document corresponds to the transmission original document 61 included in the check target set original document (S28: YES), the CPU 11 shifts the process to S29. On the other hand, when the target page original document does not correspond to the transmission original document 61 included in the check target set original document (S28: NO), the CPU 11 shifts the process to S34.

In S29, the CPU 11 executes a number-of-matches addition process. In the number-of-matches addition process S29, the CPU 11 adds "1" to a value of a number-of-matches counter indicating the number of times that the transmission target original document matches the check target set original document. Here, the number of matches is a numerical value indicating that the target page original document follows a page sequence of the check target set original document (S27: YES) and the target page original document corresponds to the transmission original document 61 included in the check target set original document (S28: YES). The number-of-matches counter is provided in the RAM 13. After "1" is added to the value of the number-of-matches counter, the CPU 11 ends the number-of-matches addition process (S29) and shifts the process to S30.

In S30, the CPU 11 determines whether the numerical value of the number-of-matches counter matches that of number-of-sheets data of the check target set original document acquired from the transmission history data. That is, in S30, the CPU 11 determines whether the transmission target original document is same as the check target set original document. Specifically, the CPU 11 determines whether all transmission original documents 61 included in the check target set original document is included in the transmission target original document in a same page sequence. When the number of matches is same as a numerical value of number-of-sheets data (S30: YES) since page continuity is checked in S27 described above and each target page original document is determined to correspond to the transmission original document 61 included in the check target set original document in S28, the CPU 11 determines that the transmission original document 61 is same as the check target set original document and shifts the process to S35. On the other hand, when the number of matches is not same as the numerical value of the number-of-sheets data (S30: NO), the CPU 11 shifts the process to S31.

In S31, the CPU 11 determines whether the process (S25 to S30) for all transmission original documents 61 included in the transmission target original document ends. When the process for the entire transmission target original document is completed (S31: YES), the CPU 11 shifts the process to S32. On the other hand, when the process for all the transmission original documents 61 included in the transmission target original document is not completed (S31: NO), the CPU 11 returns the process to S25. In this case, the CPU 11 executes the process (S25 to S30) for the transmission original document 61 related to the next page in the transmission target original document.

In S32, the CPU 11 executes an error notification process. Here, the process S32 is executed when the process for the transmission target original document is completed in a state in which a transmission original document 61 included in the check target set original document is missing (S30: NO). In this case, the transmission target original document cannot completely reproduce the check target set original document. Accordingly, in the error notification process S32, the CPU 11 displays (indicates) a page missing error notification screen indicating that a page of transmission target original document is missing on the LCD 18. After the page missing error notification screen is displayed on the LCD 18, the CPU 11 deletes the original document data related to the transmission target original document stored in the transmission facsimile data storage area 131 and storage content (for example, identification data, and the like) of the RAM 13. When the error notification process S32 ends, the CPU 11 ends the page sequence check transmission process program.

In S33, the CPU 11 executes an error notification process. The process S33 is executed when page number data of a first transmission original document 61 in the transmission target original document is not "page number: 1" (S23: NO) or page number data related to the target page original document is not continuous to page number data of an immediately preceding target page original document (S27: NO). That is, the error notification process S33 is executed when the transmission original document 61 included in the check target set original document is not along a page sequence related to the check target set original document. Specifically, the CPU 11 displays a page sequence error notification screen indicating that the page sequence is erroneous on the LCD 18 (see FIG. 14). Also in this case, the CPU 11 deletes original document data stored in the transmission facsimile data storage area 131 at present and storage content of the RAM 13. When the error notification process S33 ends, the CPU 11 ends the page sequence check transmission process program.

In S34, the CPU 11 executes the error notification process. S34 is executed when the target page original document does not correspond to the transmission original document 61 included in the check target original document (S28: NO). That is, the error notification process S34 is executed when a set original document different from the check target set original document is included in the transmission target original document. Specifically, the CPU 11 displays a set original document error notification screen indicating that the target page original document does not correspond to the check target set original document on the LCD 18 (see FIG. 13). Also in this case, the CPU 11 deletes original document data stored in the transmission facsimile data storage area 131 at present and storage content of the RAM 13. When the error notification process S34 ends, the CPU 11 ends the page sequence check transmission process program.

In S35, the CPU 11 executes an original document data transmission process. The original document data transmission process S35 is executed when all transmission original documents 61 included in the check target set original document in the transmission target original document are read according to a page sequence related to the check target set original document. That is, in the original document data transmission process S35, the CPU 11 performs the facsimile transmission in a manner in which both the check target set original document and the page sequence completely match. Specifically, the CPU 11 calls to a transmission destination based on an input of the destination input process S21. The CPU 11 facsimiles original document data in the transmission facsimile data storage area 131 to the transmission destination. When the original document data transmission process S35 ends, the CPU 11 ends the page sequence check transmission process program.

Thereby, the facsimile apparatus 1 can provide a desired destination with original document data in which both the check target set original document and the page sequence completely match by performing the facsimile transmission to the destination based on the page sequence check transmission process program.

Next, a page sequence non-check transmission process program according to this exemplary embodiment will be described in detail with reference to the drawings. FIG. 15 is a flowchart of the page sequence non-check transmission process program. As described above, it is executed by the CPU 11 in the page sequence non-check transmission process S7. Also in a description of the page sequence non-check transmission process S7, it is assumed that a transmission target original document is mounted on the original document mounting unit 2A. The transmission target original document includes a set original document previously transmitted in the set original document registration process S3.

In the page sequence non-check transmission process S7, the CPU 11 executes a destination input process S41. The destination input process S41 is same as the process of S11 and S21. Accordingly, a description of the destination input process S41 is omitted. When the destination input process S41 ends, the CPU 11 shifts the process to S42.

In S42, the CPU 11 executes a set original document specifying process. The set original document specifying process S42 is same as the above-described set original document specifying process S22. That is, the CPU 11 sets the transmission original document 61, which is a first page of the transmission target original document, to the target page original document. The CPU 11 reads original document data from the target page original document and stores the data in the transmission facsimile data storage area 131. The CPU 11 acquires identification data from the wireless tag 62 of the target page original document and stores the identification data in the RAM 13. The CPU 11 specifies the check target set original document based on the identification data. When the set original document specifying process S42 ends, the CPU 11 shifts the process to S43.

In S43, the CPU 11 executes a number-of-sheets data acquisition process. The number-of-sheets data acquisition process S43 is same as the above-described number-of-sheets data acquisition process S24. After the number-of-sheets data acquisition process S43 ends, the CPU 11 shifts the process to S44.

In S44, the CPU 11 executes an identification data acquisition process. In the identification data acquisition process S44, the CPU 11 first sets the transmission original document 61 related to the next page of the transmission target original document to the target page original document. The CPU 11 acquires identification data from the wireless tag 62 of the target page original document using the wireless tag reader 15 and stores the data in the RAM 13. When the identification data acquisition process S44 ends, the CPU 11 shifts the process to S45.

In S45, the CPU 11 determines whether the target page original document corresponds to the check target set original document on the basis of identification data acquired in the identification data acquisition process S44. Specifically, the CPU 11 performs the determination of S45 based on destination data and date-time data of the acquired identification data and destination data and date-time data related to the check target set original document. When the destination data and date-time data match and the target page original document corresponds to the check target set original document (S45: YES), the CPU 11 shifts the process to S46. On the other hand, when any one of the destination data and the date-time data is different and the target page original document does not correspond to the check target set original document (S45: NO), the CPU 11 returns the process to S44. In this case, the CPU 11 performs a process for setting the transmission original document of the next page to the target page original document within the transmission target original document. At this time, the CPU 11 deletes identification data related to other transmission original documents 61 that do not correspond to the check target set original document in the determination of S45 from the RAM 13. Therefore, the identification data acquired in the identification data acquisition process S44 is retained in the RAM 13 by the number corresponding to the number of original document sheets determined as the check target set original document in S45.

In S46, the CPU 11 executes a target page original document read process. The target page original document read process S46 is same as the target page original document read process S25. That is, the CPU 11 reads original document data from the target page original document using the scanner unit 3 and stores the data in the transmission facsimile data storage area 131. When the target page original document read process S46 ends, the CPU 11 shifts the process to S47.

In S47, the CPU 11 executes a number-of-matches addition process. In the number-of-matches addition process S47, the CPU 11 adds "1" to a numerical value of a number-of-matches counter. In this case, the numerical value of the number-of-matches counter indicating the number of times that the transmission target original document matches the check target set original document. When the number-of-matches addition process S47 ends, the CPU 11 shifts the process to S48.

In S48, the CPU 11 determines whether the numerical value of the number-of-matches counter matches a numerical value of number-of-sheets data of the check target set original document acquired from a transmission history. That is, it is determined whether all transmission original documents 61 included in the check target set original document are extracted from the transmission target original document. When the number-of-matches counter matches the numerical value of the number-of-sheets data (S48: YES), the CPU 11 shifts the process to S50. On the other hand, when the number-of-matches counter does not match the numerical value of the number-of-sheets data (S48: NO), the CPU 11 shifts the process to S49.

In S49, the CPU 11 determines whether the process (S44 to S48) for all transmission original documents 61 included in the transmission target original document ends. When the process for the entire transmission target original document is completed (S49: YES), the CPU 11 shifts the process to S50. On the other hand, when the process for all the transmission original documents 61 included in the transmission target original document is not completed (S49: NO), the CPU 11 returns the process to S44. In this case, the CPU 11 executes the process (S44 to S48) for a transmission original document 61 related to the next page of the transmission target original document.

In S50, the CPU 11 executes an extraction result notification process. In the extraction result notification process S50, the CPU 11 reports the transmission original document 61 extracted as the check target set original document from the transmission target original document to the user through the display of the LCD 18. As described above, the extraction result notification process S50 is executed through the process S48 or the process S49.

When a missing transmission original document 61 exists within the transmission original documents 61 included in the check target set original document (S48: NO and S49: YES), the CPU 11 displays a page missing error notification screen on the LCD 18 in the extraction result notification process S50 (see FIG. 16). As shown in FIG. 16, the CPU 11 specifies and reports (indicates) a missing transmission original document 61 (hereinafter, referred to as a missing original document) to configure the check target set original document when reporting the page missing error notification screen. The CPU 11 specifies a page number of the missing original document based on number-of-sheets data of the check target set original document and page number data acquired in the set original document specifying process S42 and the identification data acquisition process S44. When the extraction result notification process S50 ends, the CPU 11 shifts the process to S51.

On the other hand, when all the transmission original documents 61 included in the check target set original document are extracted from the transmission target original document (S48: YES), the CPU 11 displays the entire page extraction screen on the LCD 18 in the extraction result notification process S50 (see FIG. 17). When the entire page extraction screen is displayed, the CPU 11 displays page numbers of transmission original documents 61 related to the extracted check target set original document according to an extraction sequence (that is, a sequence of performing the process of S44 to S49). Also in this case, when the extraction result notification process S50 ends, the CPU 11 shifts the process to S51.

In S51, the CPU 11 determines whether original document data stored in the transmission facsimile data storage area 131 is transmitted. Specifically, the CPU 11 performs the determination of S51 based on an operation signal from the operation panel 17. When the facsimile transmission of the original document data is performed (S51: YES), the CPU 11 shifts the process to S52. On the other hand, when the facsimile transmission of the original document data is stopped (S51: NO), the CPU 11 ends the page sequence non-check transmission process program. At this time, the CPU 11 deletes the original document data from the transmission facsimile data storage area 131.

Here, in the extraction result notification process S50, three options are displayed on the LCD 18 (see FIGS. 16 and 17). An option "page sequence edit transmission" is selected when original document data of the transmission original document 61 related to the extracted check target set original document is facsimiled according to a page number sequence related to the check target set original document. An option "transmission continuation" is selected when the original document data of the transmission original document 61 related to the extracted check target set original document is transmitted in a sequence in which the process (of S44 to S49) is performed. On the other hand, an option "cancel" is selected when the facsimile transmission of original document data stored in the transmission facsimile data storage area 131 is stopped.

That is, when the option "page sequence edit transmission" or "transmission continuation" is selected by an operation of the operation panel 17 by the user (S51: YES), the CPU 11 shifts the process to S52. On the other hand, when the option "cancel" is selected by the operation of the user (S51: NO), the CPU 11 deletes the original document data and ends the page sequence non-check process program.

In S52, the CPU 11 determines whether a transmission sequence is edited. Specifically, the CPU 11 determines whether the option "page sequence edit transmission" is selected based on an operation signal of the operation panel 17. When the option "page sequence edit transmission" is selected (S52: YES), the CPU 11 shifts the process to S53. On the other hand, when the option "transmission continuation" is not selected (S52: NO), the CPU 11 shifts the process to S54.

In S53, the CPU 11 executes a transmission sequence edit process. In the transmission sequence edit process S53, the CPU 11 edits the transmission sequence of the original document data stored on a page-by-page basis by the process of S42 to S49 in a manner according to a page number sequence of the transmission original document 61 extracted as the check target set original document. As described above, the CPU 11 operates by associating the acquisition of identification data with the read of the original document data for one transmission original document 61 (S42 and S44 to S49). Accordingly, the sequence of original document data stored in the transmission facsimile data storage area 131 matches the sequence of identification data acquired from each page of the check target set original document stored in the RAM 13. The identification data includes page number data in the check target set original document. Thereby, the CPU 11 can set a read sequence and a transmission sequence of original document data within the transmission facsimile data storage area 131 to a page number sequence by referring to page number data stored in the RAM 13. After the transmission sequence of the original document data is edited to the page number sequence of the check target set original document, the CPU 11 shifts the process to S54.

In S54, the CPU 11 executes an original document data transmission process. In the original document data transmission process S54, the CPU 11 facsimiles original document data stored in the transmission facsimile data storage area 131 to a desired destination. Specifically, the CPU 11 first dials to a destination according to input content of the destination input process S41. Thereafter, the CPU 11 facsimiles original document data stored in the transmission facsimile data storage area 131. At this time, when the option "transmission continuation" is selected (S52: NO), the CPU 11 facsimiles the original document data according to a sequence number in which the process (of S42 to S49) is performed. On the other hand, when the original document data transmission process S54 is performed after the transmission sequence edit process S53, the CPU 11 facsimiles the original document data according to a sequence edited in the transmission sequence edit process S53 (that is, a page number sequence of the check target set original document). When the facsimile transmission of original document data to a desired destination ends, the CPU 11 ends the page sequence non-check transmission process program.

As described above, the facsimile apparatus 1 according to this exemplary embodiment acquires identification data from the wireless tag 62 included in the transmission target original document (S22, S26, S42, and S44) and determines whether the target page original document corresponds to the check target set original document (a combination of pages of an original document previously transmitted to some destination in one transmission in this exemplary embodiment) (S28 and S48). When all transmission original documents 61 included in the check target set original document are extracted from the transmission target original document (S28 and S30: YES and S48: YES), the facsimile apparatus 1 facsimiles original document data of the same content as the check target set original document to a desired destination (S35 and S54). Accordingly, the facsimile apparatus 1 can omit the work of the user who determines whether the transmission target original document is same combination as the check target set original document. That is, when the check target set original document is facsimiled, the facsimile apparatus 1 can reduce the workload of the user. When all the transmission original documents 61 included in the check target set original document are extracted, the facsimile apparatus 1 automatically transmits original document data to a desired destination. Accordingly, the facsimile apparatus 1 can transmit original document data corresponding to the check target set original document without forcing the user to do the retransmission work.

The facsimile apparatus 1 writes identification data to wireless tags 62 of all transmission original documents 61 in which an original document is transmitted in one communication by the set original document registration process S3 (S13). Here, when the set original document previously transmitted in one transmission is retransmitted, a situation in which the set original document is apt to be mixed with another original document in the transmission target original document or a situation in which each original document of the set original document is separately managed is assumed. Also in this case, the facsimile apparatus 1 determines whether the transmission target original document is same as the check target set original document, thereby reducing the burden of the user related to the work for scanning content of the transmission target original document. Also in this case, since original document data based on the transmission target original document is transmitted when the transmission target original document is same as the check target set original document, the facsimile apparatus 1 can transmit the same content as the previously transmitted check target set original document to a desired destination without requiring the retransmission work.

Whenever transmission is performed in one communication by the set original document registration transmission process S3, the facsimile apparatus 1 stores destination data and date-time data as transmission history data in the transmission history storage area 141. The facsimile apparatus 1 writes the destination data and the date-time data of the same content to the wireless tag 62 of the transmission original document 61 included in the set original document (S13). The facsimile apparatus 1 determines whether the transmission target original document corresponds to the check target original document on the basis of the destination data and the date-time data. Accordingly, the facsimile apparatus 1 can surely identify whether the transmission target original document is same as the check target set original document with high accuracy.

When the numerical value of the number-of-matches counter does not match the numerical value of number-of-sheets data of the check target set original document (S30: NO, S31: YES, S48: NO, and S49: YES), the facsimile apparatus 1 determines that the transmission target original document is not same as the check target set original document and notifies the user that a transmission original document 61 included in the check target set original document is missing (S32 and S50). Accordingly, the user can make a proper countermeasure (for example, addition of a missing original document to configure the check target set original document) based on the notification. As a result, the facsimile apparatus 1 can prevent facsimile transmission in which the intention of the user is not reflected.

When the transmission target original document completely matches a combination and sequence of transmission original documents 61 in the check target set original document in the page sequence check transmission process S6 (S27 to S30), the facsimile apparatus 1 facsimiles original document data based on the transmission target original document. Accordingly, the facsimile apparatus 1 can surely perform facsimile transmission of the same content as the check target set original document to a desired destination.

Whenever transmission is made in one communication by the set original document registration transmission process S3, the facsimile apparatus 1 writes each page number data as identification data to the wireless tag 62 of the transmission original document 61 included in the set original document (S13). At this time, the facsimile apparatus 1 stores number-of-sheets data related to the set original document as transmission history data in the transmission history storage area 141. When a page sequence of the check target set original document is continuous in the page sequence check transmission process S6 (S27: YES), the facsimile apparatus 1 continues to read original document data from the transmission target original document (S28 to S31). When a different original document is included in the transmission target original document or when the page sequence is discontinuous (S27: NO), the communication apparatus stops the read of original document data at that time (S33). As a result, the user can detect that transmission is impossible in the same manner as that of the previously transmitted check target set original document on the basis of the read stop of the original document data. The user can make a proper countermeasure based on the detection.

When the transmission target original document in the page sequence non-check transmission process S7 corresponds to the check target set original document previously transmitted in one communication (S45), the facsimile apparatus 1 detects whether the transmission target original document includes the transmission original documents 61 included in the check target set original document on the basis of page number data acquired from the wireless tag 62 and number-of-sheets data of the check target set original document (S48). When the transmission target original document includes all the transmission original documents 61 included in the check target set original document, the facsimile apparatus 1 transmits original document data (S53). That is, the facsimile apparatus 1 can transmit original document data including information of the same content as the check target set original document even when the transmission target original document is mounted on the original document mounting unit 2A without considering a page sequence of the check target set original document using the page sequence non-check transmission process S7. In other words, the facsimile apparatus 1 can omit the check work when the transmission target original document is mounted.

When a selection operation of the option "page sequence edit transmission" is performed in the page sequence non-check transmission process S7 (S52: YES), the facsimile apparatus 1 executes a transmission sequence edit process S53. Thereby, a transmission sequence of original document data based on the transmission target original document is edited to a sequence according to a page sequence of the check target set original document based on page numbers acquired from wireless tags 62. The facsimile apparatus 1 transmits the original document data to a predetermined destination in a sequence edited in the transmission sequence edit process S53 (S54). Accordingly, the facsimile apparatus 1 can transmit original document data of the same content in the same sequence as in transmission by the set original document registration transmission process S3 even when the transmission target original document is mounted on the original document mounting unit 2A without considering a page sequence of the check target set original document.

When a transmission original document 61 excluded from the transmission target original document exists within the transmission original documents 61 included in the check target set original document in the page sequence non-check transmission process S7 (S48: NO and S49: YES), the facsimile apparatus 1 displays the presence of a page missing error notification screen (see FIG. 16) on the LCD 18 (S50). Accordingly, the user can detect a missing transmission original document 61 to configure the check target set original document in the transmission target original document. As shown in FIG. 16, a page number of the missing transmission original document 61 is displayed in the page number error notification screen. Accordingly, the user can make a proper countermeasure of addition of the missing transmission original document 61 and the like.

When an original document other than the check target set original document is included in the transmission target original document in the page sequence non-check transmission process S7 (S45: NO), the facsimile apparatus 1 starts the process (of S44 to S49) for a transmission original document 61 of the next page without executing the target page original document read process S45. That is, original document data based on an original document other than the check target set original document is not stored in the transmission facsimile data storage area 131 and does not become a facsimile transmission target. Thereby, the facsimile apparatus 1 can perform proper information management capable of preventing information based on a transmission original document 61 other than the check target set original document from being involuntarily transmitted to a third party.

The facsimile apparatus 1 executes the read of original document data (S46 and the like) in association with the acquisition of identification data (S44 and the like) in the page sequence check transmission process S6 and the page sequence non-check transmission process S7. Accordingly, the read of the original document data can be completed substantially simultaneously with the end of a determination based on the identification data. As a result, if it is determined that transmission of original document data is permitted on the basis of the identification data, the original document data can be immediately transmitted. That is, the facsimile apparatus 1 can shorten a time required for transmission work and improve work efficiency related to the transmission of original document data.

The facsimile apparatus 1 checks whether the user transmits original document data through the display of the LCD 18 and the like in the page sequence check transmission process S6 and the page sequence non-check transmission process S7 (for example, see FIGS. 16 and 17). Accordingly, the facsimile apparatus 1 can prevent the user from involuntarily transmitting original document data.

While the present invention has been shown and described with reference to certain exemplary embodiments thereof, it will be understood by those skilled in the art that various changes in form and details may be made therein without departing from the spirit and scope of the invention as defined by the appended claims.

For example, this exemplary embodiment is configured to set a transmission original document 61 transmitted on the basis of the set original document registration transmission process S3 to a "set original document" and write identification data to a wireless tag 62, but is not limited to this configuration. For example, a configuration can be made such that the user can write identification data to a wireless tag 62 when a transmission original document 61 as a facsimile transmission target is created. Also in this case, it is advantageous to write destination data, date-time data, and page number data to the wireless tag 62 as the identification data.

This exemplary embodiment determines whether a transmission target original document corresponds to a check target set original document on the basis of the identity of "destination data" and "date-time data", but is not limited thereto. For example, a configuration can be made to perform the determination based on only the identity of "date-time data".

It can be determined whether the transmission target original document corresponds to the check target set original document on the basis of "content of identification data". That is, data to be used for the determination is not limited to "destination data" and/or "date-time data" and any data capable of specifying one check target set original document can be used for the determination.

This exemplary embodiment specifies the check target set original document based on identification data acquired from the transmission original document 61 in a first page of the transmission target original document, but is not limited thereto. For example, a document arbitrarily selected by the user from a FAX transmission history list display screen can be set as a check target set original document. The check target set original document can be specified based on a condition (for example, a destination or a date and time) arbitrarily set by the user using the operation panel 17.

In this exemplary embodiment, the case that a set original document transmitted in one communication is retransmitted by facsimile has been described. However, when a set original document transmitted in one communication is copied, identification data written to the above-described wireless tag may be used. In this case, the transmission process of S35 in FIG. 12 and S54 in FIG. 15 is changed to a recording process by the laser printer 30. Further, in a set original document registration transmission process of S3, a process for writing identification data capable of identifying an original document handled in one communication of facsimile transmission to a wireless tag of the original document is performed.

Further, in the case of copying a same set of original documents in a state in which identification data capable of identifying an original document copied as a set of original documents is written to the original document serving as a master copy, the identification data written to the wireless tag of the master copy can be used when determining whether a set of original documents is the same as previous documents.

What is claimed is:

1. A communication apparatus comprising:
    a mode setting unit configured to receive input for selecting either one of a registration transmission mode and a check transmission mode;
    a reading unit configured to at least read first document data from a first multi-page document and second document data from a second multi-page document on a page-by-page basis;
    a transmission unit configured to transmit the first and second document data read by the reading unit to one or more designated destinations;
    a writing unit configured to wirelessly write information to a wireless tag attached to each page of the first multi-page document;
    an acquisition unit configured to wirelessly acquire identification information from a wireless tag attached to each page of the second multi-page document;
    an identification unit; and
    a transmission controller,
    wherein, when the registration transmission mode is selected:
        the reading unit reads the first document data from the first multi-page document,
        the writing unit wirelessly writes identification information to the wireless tag attached to each page of the first multi-page document, the identification information identifying the first multi-page document, and
        the transmission controller controls the transmission unit to transmit the first document data to a first designated destination; and
    wherein, when the check transmission mode is selected:
        the reading unit reads the second document data from the second multi-page document,
        the acquisition unit wirelessly acquires identification information from the wireless tag attached to each page of the first multi-page document,
        the identification unit identifies whether a combination of pages of the second multi-page document corresponds to a combination of pages of the first multi-page document based on the identification information acquired by the acquisition unit,
        the transmission controller controls the transmission unit to transmit the second document data to the second designated designation if the identification unit identifies that the combination of pages of the second multi-page document corresponds to the combination of pages of the first multi-page document.

2. The communication apparatus according to claim 1, further comprising:
    a history storage unit configured to store transmission history information comprising at least transmission destination information indicating a transmission destination of the first multi-page document and date-time information indicating a date and time related to transmission process of the first multi-page document in one communication at each transmission;
    a history information designating unit configured to receive input for designating one transmission history information from among transmission history information for a plurality of multi-page documents stored in the history storage unit;
    a specifying unit configured to specify the first multi-page document based on the designated one transmission history information;
    wherein, when the registration transmission mode is selected,
        the writing unit writes transmission destination information and date-time information as identification information to the wireless tag attached to each page of the first multi-page document, and
    wherein, when the check transmission mode is selected,
        the identification unit identifies whether the combination of pages of the second multi-page document is the same as the combination of pages of the first multi-page document specified by the specifying unit based on the transmission destination information and date-time information that are stored in the history storage unit and that correspond to the first multi-page document specified by the specifying unit, and the transmission destination information and the date-time information acquired from the wireless tags of the second multi-page document by the acquisition unit, and
        if the identification unit identifies that the combination of pages of the second multi-page document is the same as that of the first multi-page document specified by the specifying unit, the transmission controller controls the transmission unit to transmit the second document data from the second multi-page document that is identified as being the same as the first multi-page document specified by the specifying unit, to a designated destination.

3. The communication apparatus of claim 1, further comprising a history storage unit which stores transmission history information comprising at least transmission destination information indicating a transmission destination of the first document data and date-time information indicating a date and time related to a transmission process of the first document data in one communication at each transmission,
    wherein, when the transmission unit transmits the first multi-page document in one communication, the writing unit writes the transmission destination information and date-time information as identification information to the wireless tag attached to each page of the first multi-page document, and
    wherein the identification unit specifies that the first multi-page document was previously transmitted in the one communication based on the transmission destination information and the date-time information of the transmission history information stored in the history storage unit and transmission destination information and date-time information of identification information acquired from the wireless tags of the second multi-page document, and identifies whether the combination of pages of the second multi-page document is the same as that of the first multi-page document.

4. The communication apparatus of claim 3, further comprising:
- a counting unit configured to count a number of pages of the second multi-page document as a count result;
- a history controller configured to record transmission history information comprising number-of-pages information indicating a number of pages of the first-multi-page document to the history storage unit when the first multi-page document is transmitted in the one communication;
- an indication unit configured to indicate various information; and
- an indication controller configured to control an indication content of the indication unit,
- wherein the identification unit identifies that the combination of pages of the second multi-page document is not same as the combination of pages of the first multi-page document previously transmitted if the number-of-pages information of the transmission history information related to the first multi-page document specified based on the identification information does not match the count result of the counting unit, and
- wherein the indication controller controls the indication unit to indicate that the combination of pages of the second multi-page document is not the same as the combination of pages of the first multi-page document previously transmitted in the one communication if the identification unit identifies that the combination of pages of the second multi-page document is not the same as the combination of pages of the first multi-page document previously transmitted in the one communication.

5. The communication apparatus of claim 3,
- wherein the writing unit writes page information indicating a transmission sequence of the first document data from each page of the first multi-page document to the wireless tag attached to each page of the first multi-page document when the first multi-page document is transmitted in the one communication,
- wherein the communication apparatus further comprises a continuity determination unit configured to determine, based on page information acquired from a wireless tag of a target page of the second multi-page document and page information acquired from a wireless tag of a reference page of the second multi-page document arranged immediately before the target page, whether a sequence of the target page and the reference page is continuous, and
- wherein the transmission controller controls the transmission unit to transmit the second document data from the second multi-page document if the identification unit identifies that the combination of pages of the second multi-page document is same as that of the first multi-page document previously transmitted in the one communication, and if the continuity determination unit determines that a sequence of all pages of the second multi-page document is continuous.

6. The communication apparatus of claim 5, further comprising a read controller configured to control the reading unit to
- read second document data from the target page if the identification unit identifies that the combination of pages of the second multi-page document is the same as that of the first multi-page document previously transmitted in the one communication, and if the continuity determination unit determines that the sequence of the target page and the reference page is continuous, and
- stop reading the second document data from the second multi-page document if the identification unit identifies that the combination of pages of the second multi-page document is not same as that of the first multi-page document previously transmitted in the one communication, or if the continuity determination unit determines that the sequence of the target page and the reference page is not continuous.

7. The communication apparatus of claim 3, further comprising:
- a counting unit configured to count a number of pages of the second multi-page document as a count result;
- a history controller configured for record transmission history information comprising number-of-pages information indicating a number of pages of the first multi-page document to the history storage unit when the first multi-page document is transmitted in the one communication,
- wherein the writing unit writes page information indicating a transmission sequence of the first document data from each page of the first multi-page document to a wireless tag attached to each page of the first multi-page document when the first multi-page document is transmitted in the one communication,
- wherein the communication apparatus further comprises a missing original document detection unit configured to detect whether the second multi-page document includes all pages of the first multi-page document based on the number-of-pages information related to the first multi-page document stored in the history storage unit and page information acquired from the second multi-page document if the identification unit identifies that the combination of pages of the second multi-page document is same as that of the first multi-page document previously transmitted in the one communication,
- wherein the transmission controller controls the transmission unit to transmit the second document data from the second multi-page document if the missing original document detection unit detects that the second multi-page document includes all the pages of the first multi-page document.

8. The communication apparatus of claim 7, further comprising:
- a continuity detection unit configured to detect whether pages of the second multi-page document are continuous based on page information related to the second multi-page document if the identification unit identifies that the combination of pages of the second multi-page document is same as that of the first multi-page document previously transmitted in the one communication and if the missing original document detection unit detects that the second multi-page document includes all the pages of the first multi-page document; and
- a transmission sequence edit unit configured to edit a transmission sequence of the second document data from the respective pages of the second multi-page document to a transmission sequence according to the page information of each page of the first multi-page document if the continuity detection unit detects that the pages of the second multi-page document are not continuous,
- wherein the transmission controller controls the transmission unit to transmit the second document data from each page of the second multi-page document based on the transmission sequence edited by the transmission sequence edit unit.

9. The communication apparatus of claim 7, further comprising:
an indication unit configured to indicate various information; and
an indication controller configured to control indication content of the indication unit,
wherein the indication controller controls the indication unit to indicate that a missing page exists in the second multi-page document with reference to the first multi-page document when the missing original document detection unit detects that a page exists, which is a part of the first multi-page document but not included in the second multi-page document.

10. The communication apparatus of claim 7, further comprising:
an indication unit configured to indicate various information;
an indication controller configured to control indication content of the indication unit; and
a missing original document specifying unit configured to specify a missing page in the second multi-page document with reference to the first multi-page document when the missing original document detection unit detects that a page exits, which is a part of the first multi-page document but not included in the second multi-page document,
wherein the indication controller controls the indication unit to indicate the missing page specified by the missing original document specifying unit.

11. The communication apparatus of claim 7, further comprising a transmission target setting unit configured to, when the second multi-page document includes a page which is not a part of the first multi-page document specified based on the identification information, set only pages of the second multi-page document, which are a part of the first multi-page document, as a transmission target by the transmission unit.

12. The communication apparatus of claim 1, further comprising a controller configured to control the reading unit and the acquisition unit so that the acquisition of identification information by the acquisition unit and the reading of the second document data from the second multi-page document are performed in association with each other.

13. The communication apparatus of claim 1, further comprising a transmission check unit configured to check whether transmission of the second document data from the second multi-page document by the transmission unit is allowed.

14. A method for transmitting document data, the method comprising:
receiving input to select either one of a registration transmission mode and a check transmission mode; and
when the registration transmission mode is selected:
reading first document data from a first multi-page document comprising a plurality of pages;
transmitting the first document data to a first designated destination in one communication;
wirelessly writing identification information to a wireless tag attached to each page of the first multi-page document, the identification information comprising date-time information indicating a date and time related to a transmission of the first original document data;
storing the identification information in a history storage unit; and
when the check transmission mode is selected;
reading second document data from a second multi-page document comprising a plurality of pages;
wirelessly acquiring identification information comprising date-time information from a wireless tag attached to each page of the second multi-page document;
determining whether the second multi-page document is the same as the first multi-page document by comparing the date-time information in the history storage unit and the date-time information acquired from the second multi-page document; and
transmitting the second document data to a second designated destination if it is determined that the second multi-page document is the same as the first multi-page document.

15. A communication apparatus comprising:
a reading unit configured to at least read first document data from a first multi-page document and second document data from a second multi-page document on a page-by-page basis;
a destination designating unit configured to designate one or more destinations of the first document data and the second document data read by the reading unit;
a transmission unit configured to transmit the first document data and the second document data to the one or more designated destinations designated by the destination designating unit;
an writing unit configured to, when the transmission unit transmits the first document data for the first multi-page document in one communication, write transmission destination information and date-time information for identifying the first multi-page document to a wireless tag attached to each page of the first multi-page document, wherein the transmission destination information indicates the a transmission destination of the first multi-page document and the date-time information indicate a date and time of a transmission process of the first document data;
a history storage unit configured to store transmission history information comprising at least the transmission destination information and the date-time information for each transmission by the transmission unit in one communication;
an acquisition unit configured to wirelessly acquire identification information from a wireless tag attached to each page of the second multi-page document;
a history information designating unit configured to receive input for designating one transmission history information from among the transmission history information for a plurality of multi-page documents stored in the history storage unit;
a specifying unit configured to specify the first multi-page document previously transmitted in the one communication based on the designated one transmission history information;
an identification unit configured to identify whether a combination of pages of the second multi-page document is same as a combination of pages of the first multi-page document based on the transmission destination information and the date-time information which are stored in the history storage unit for the first multi-page document specified by the specifying unit and transmission destination information and date-time information of the identification information acquired from the wireless tags of the second multi-page document by the acquiring unit; and
a transmission controller configured to, if the identification unit identifies that the combination of pages of the second multi-page document is same as that of the first multi-page document specified, control the transmission unit to transmit the second document data read from the second multi-page document which is identified as being the same as the first multi-page document specified by the specifying unit to a destination designated by the destination designating unit.

* * * * *